United States Patent
Gallegos-Lopez et al.

(10) Patent No.: US 8,446,117 B2
(45) Date of Patent: May 21, 2013

(54) METHODS, SYSTEMS AND APPARATUS FOR ADJUSTING DUTY CYCLE OF PULSE WIDTH MODULATED (PWM) WAVEFORMS

(75) Inventors: Gabriel Gallegos-Lopez, Lomita, CA (US); Michael H. Kinoshita, Redondo Beach, CA (US); Ray M. Ransom, Big Bear City, CA (US); Milun Perisic, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 266 days.

(21) Appl. No.: 12/983,669

(22) Filed: Jan. 3, 2011

(65) Prior Publication Data

US 2012/0169263 A1 Jul. 5, 2012

(51) Int. Cl.
*H02P 6/00* (2006.01)

(52) U.S. Cl.
USPC ............ 318/400.29; 318/400.01; 318/800; 318/805; 318/819

(58) Field of Classification Search
USPC ............ 318/400.29, 400.01, 819, 800, 805
See application file for complete search history.

(56) References Cited

U.S. PATENT DOCUMENTS 6,058,031 A * 5/2000 Lyons et al. .................. 363/67
7,294,989 B2 11/2007 Saren
7,612,522 B2 11/2009 Williams et al.

OTHER PUBLICATIONS

Office Action, dated Jul. 11, 2012, for U.S. Appl. No. 12/722,166.
Response to Office Action, dated Jul. 23, 2012, for U.S. Appl. No. 12/722,166.
Parsa, L., et al. "Performance Improvement of Permanent Magnet AC Motors," May 2005, A Dissertation submitted to the Office of Graduate Studies of Texas A&M University.
Ryu, H-M., et al. "Analysis of Multiphase Space Vector Pulse-Width Modulation Based on Multiple d-q Spaces Concept," IEEE Transactions on Power Electronics, Nov. 2005, pp. 1364-1371, vol. 20, No. 6.
Holtz, J., et al. "On Continuous Control of PWM Inverters in the Overmodulation Range Including the Six-Step Mode," IEEE Transactions on Power Electronics, Oct. 1993, pp. 546-553, vol. 8. No. 4.
Zhao, Y., et al. "Modeling and Control of a Multiphase Induction Machine with Structural Unbalance," IEEE Transactions on Energy Conversion, Sep. 1996, pp. 570-577, vol. 11, No. 3.

(Continued)

*Primary Examiner* — Walter Benson
*Assistant Examiner* — David Luo
(74) *Attorney, Agent, or Firm* — Ingrassia Fisher & Lorenz, P.C.

(57) ABSTRACT

Embodiments of the present invention relate to methods, systems and apparatus for controlling operation of a multiphase machine in a vector controlled motor drive system when the multi-phase machine operates in an overmodulation region. The disclosed embodiments provide a mechanism for adjusting a duty cycle of PWM waveforms so that the correct phase voltage command signals are applied at the angle transitions. This can reduce variations/errors in the phase voltage command signals applied to the multi-phase machine so that phase current may be properly regulated thus reducing current/torque oscillation, which can in turn improve machine efficiency and performance, as well as utilization of the DC voltage source.

24 Claims, 22 Drawing Sheets

OTHER PUBLICATIONS

Toliyat, H., et al. "A Novel Direct Torque Control (DTC) Method for Five-Phase Induction Machines," IEEE Applied Power Electronics Conference and Exposition, Aug. 2002, pp. 162-168, vol. 1.

Robert-Dehault, E., et al. "Study of a 5-Phases Synchronous Machine fed by PWM Inverters Under Fault Conditions," Proc. of ICEM, Aug. 2002, pp. 1-2.

Oleschuk, V., "Synchronous Flexible Overmodulation Control of Five-Phase Inverters," Proceedings of the ICEM, 2008, pp. 1-6.

Fu, J-R., et al. Disturbance-Free Operation of a Multiphase Current-Regulated Motor Drive with an Opened Phase, IEEE Transactions on Industry Applications, Sep./Oct. 1994, pp. 1267-1274, vol. 30, No. 5.

Perisic, M., et al. U.S. Appl. No. 12/722,166, filed Mar. 11, 2010, entitled "Methods, Systems and Apparatus for Overmodulation of a Five-Phase Machine".

\* cited by examiner

| Voltage Switching Vector | Sa | Sb | Sc | Sd | Se |
|---|---|---|---|---|---|
| 0 | 0 | 0 | 0 | 0 | 0 |
| 1 | 1 | 1 | 0 | 0 | 1 |
| 11 | 1 | 0 | 0 | 0 | 0 |
| 21 | 0 | 1 | 0 | 0 | 1 |
| 2 | 1 | 1 | 0 | 0 | 0 |
| 12 | 1 | 1 | 1 | 0 | 1 |
| 22 | 1 | 1 | 0 | 1 | 0 |
| 3 | 1 | 1 | 1 | 0 | 0 |
| 13 | 0 | 1 | 0 | 0 | 0 |
| 23 | 1 | 0 | 1 | 0 | 0 |
| 4 | 0 | 1 | 1 | 0 | 0 |
| 14 | 1 | 1 | 1 | 1 | 0 |
| 24 | 0 | 1 | 1 | 0 | 1 |
| 5 | 0 | 1 | 1 | 1 | 0 |
| 15 | 0 | 0 | 1 | 0 | 0 |
| 25 | 0 | 1 | 0 | 1 | 0 |
| 6 | 0 | 0 | 1 | 1 | 0 |
| 16 | 0 | 1 | 1 | 1 | 1 |
| 26 | 1 | 0 | 1 | 1 | 0 |
| 7 | 0 | 0 | 1 | 1 | 1 |
| 17 | 0 | 0 | 0 | 0 | 0 |
| 27 | 0 | 0 | 1 | 0 | 1 |
| 8 | 0 | 0 | 0 | 1 | 1 |
| 18 | 1 | 0 | 1 | 1 | 1 |
| 28 | 0 | 1 | 0 | 1 | 1 |
| 9 | 1 | 0 | 0 | 1 | 1 |
| 19 | 0 | 0 | 0 | 0 | 1 |
| 29 | 1 | 0 | 0 | 1 | 0 |
| 10 | 1 | 0 | 0 | 0 | 1 |
| 20 | 1 | 1 | 0 | 1 | 1 |
| 30 | 1 | 0 | 1 | 0 | 1 |
| 31 | 1 | 1 | 1 | 1 | 1 |

*FIG. 3C*

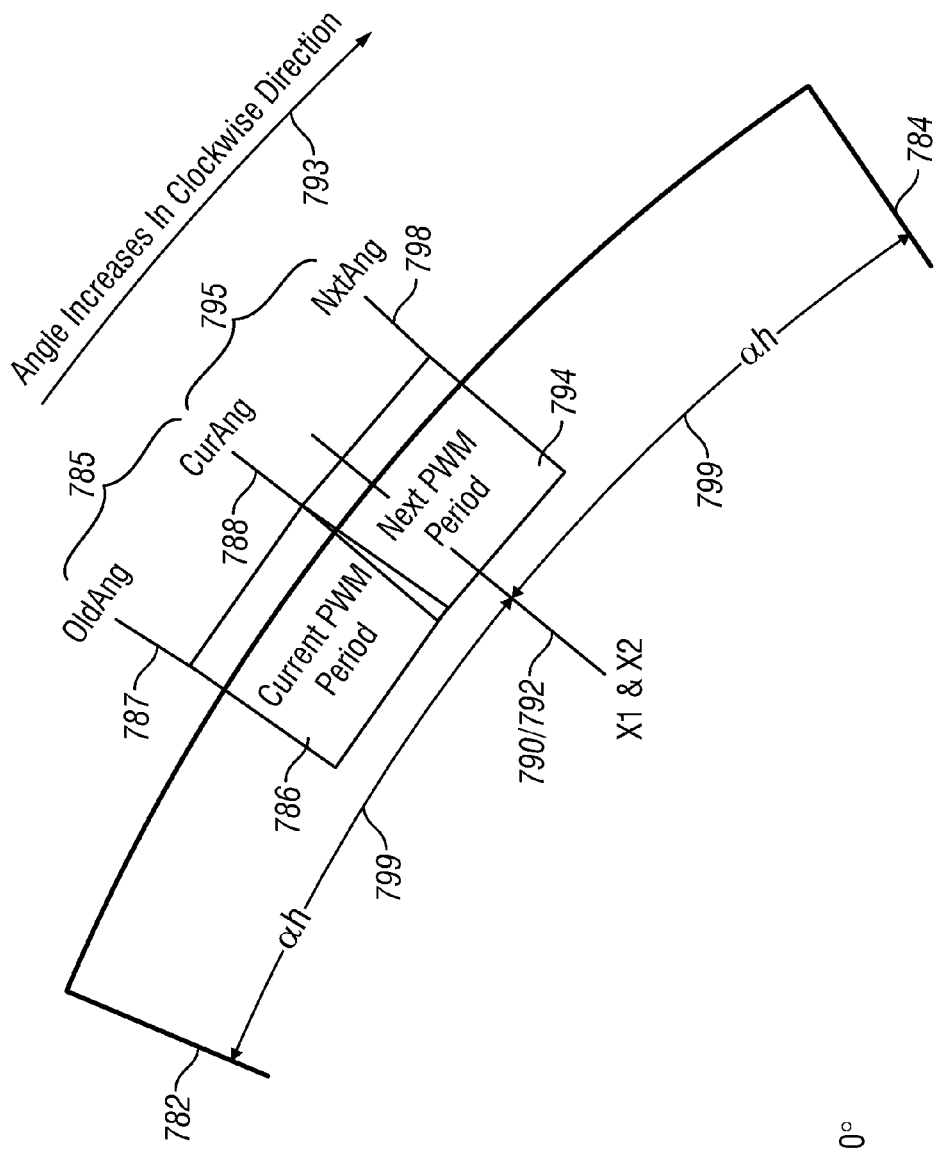
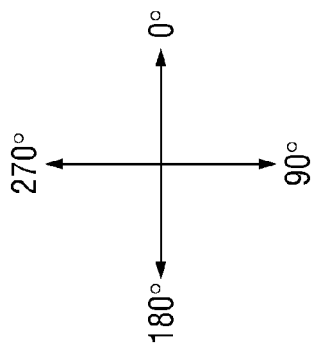
FIG. 7C

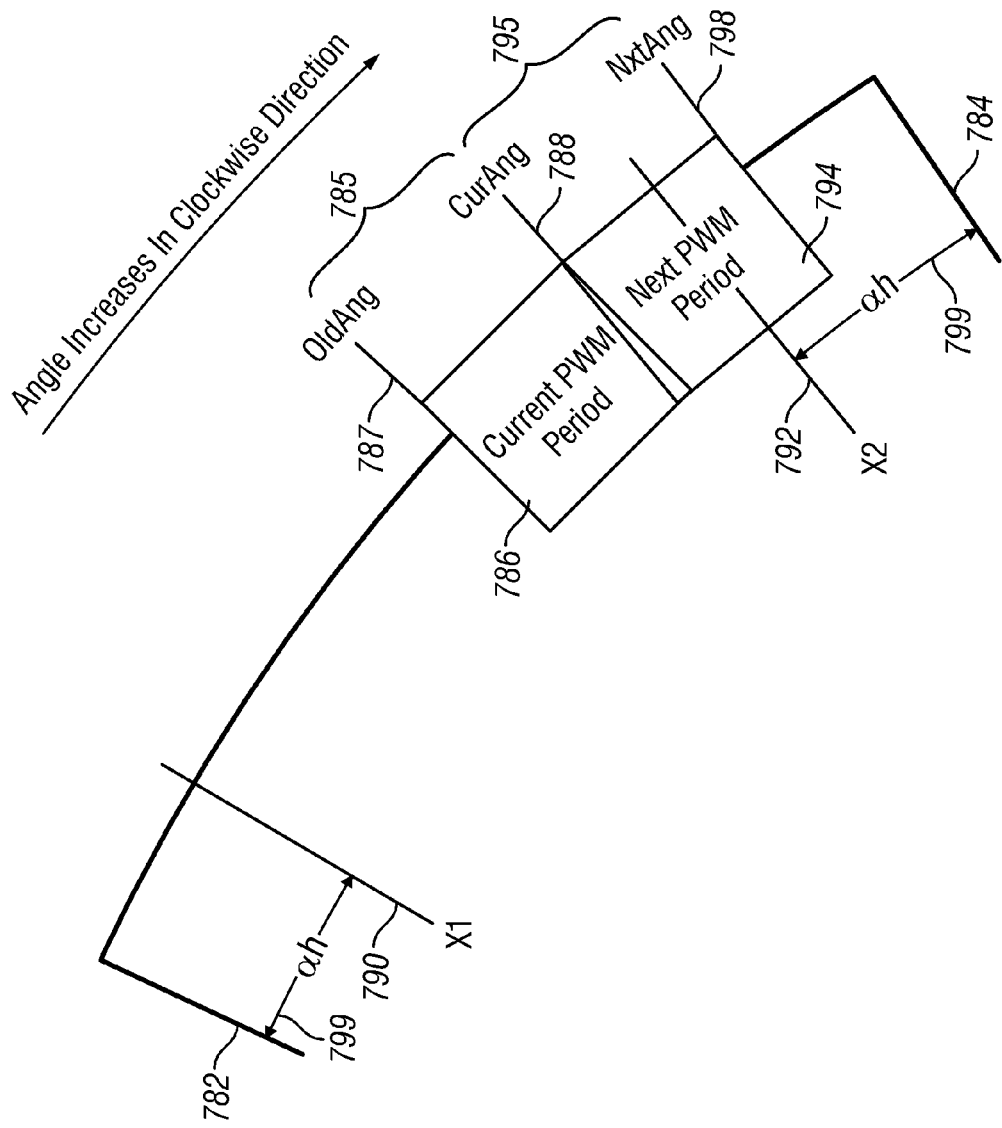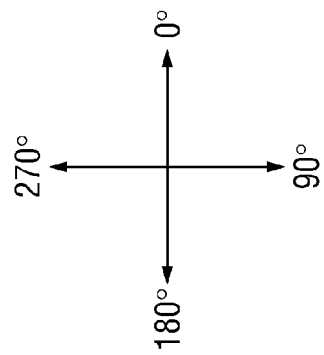
FIG. 7G

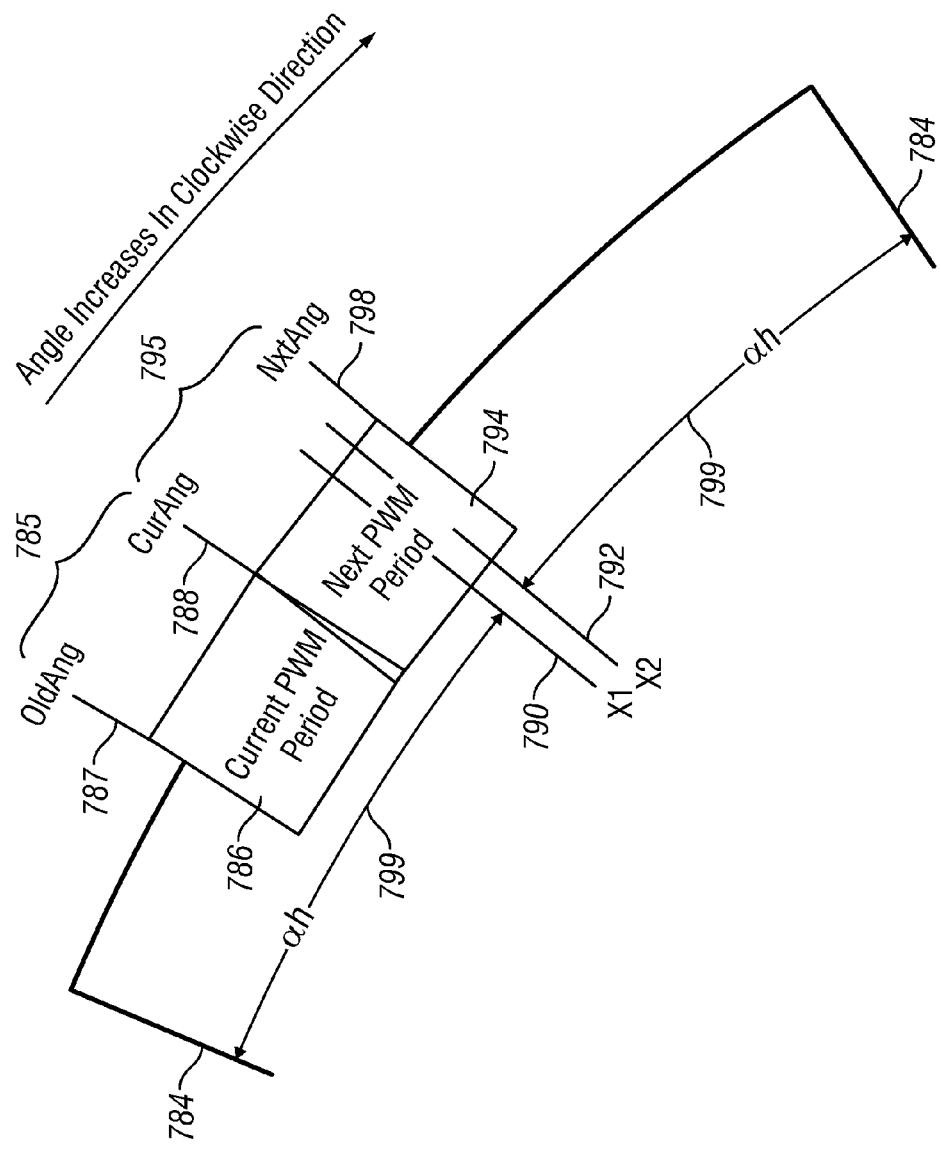
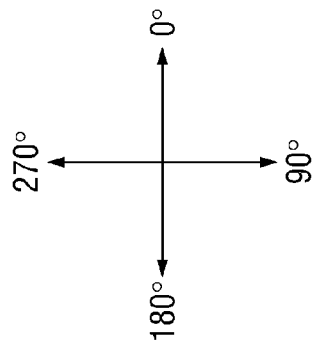
FIG. 71

METHODS, SYSTEMS AND APPARATUS FOR ADJUSTING DUTY CYCLE OF PULSE WIDTH MODULATED (PWM) WAVEFORMS

STATEMENT REGARDING FEDERALLY SPONSORED RESEARCH OR DEVELOPMENT

This invention was made with Government support under DE-FC26-07NT43123, awarded by the US-Department of Energy. The Government has certain rights in this invention.

TECHNICAL FIELD

Embodiments of the present invention generally relate to techniques for controlling operation of multi-phase systems, and more particularly relate to methods, systems and apparatus for adjusting duty cycle of pulse width modulated (PWM) waveforms used to control a multi-phase machine.

BACKGROUND OF THE INVENTION

Electric machines are utilized in a wide variety of applications. For example, hybrid/electric vehicles (HEVs) typically include an electric traction drive system that includes an alternating current (AC) electric motor which is driven by a power converter with a direct current (DC) power source, such as a storage battery. Motor windings of the AC electric motor can be coupled to inverter sub-modules of a power inverter module (PIM). Each inverter sub-module includes a pair of switches that switch in a complementary manner to perform a rapid switching function to convert the DC power to AC power. This AC power drives the AC electric motor, which in turn drives a shaft of HEV's drivetrain. Traditional HEVs implement two three-phase pulse width modulated (PWM) inverter modules and two three-phase AC machines (e.g., AC motors) each being driven by a corresponding one of the three-phase PWM inverter modules that it is coupled to.

Many modern high performance AC motor drives use the principle of field oriented control (FOC) or "vector" control to control operation of the AC electric motor. In particular, vector control is often used in variable frequency drives to control the torque applied to the shaft (and thus finally the speed) of an AC electric motor by controlling the current fed to the AC electric motor. In short, stator phase currents are measured and converted into a corresponding complex space vector. This current vector is then transformed to a coordinate system rotating with the rotor of the AC electric motor.

Recently, researchers have investigated the possibility of using multi-phase machines in various applications including electric vehicles. As used herein, the term "multi-phase" refers to more than three-phases, and can be used to refer to electric machines that have three or more phases. A multi-phase electric machine typically includes a multi-phase PWM inverter module that drives one or more multi-phase AC machine(s). One example of such a multi-phase electric machine is a five-phase AC machine. In a five-phase system, a five-phase PWM inverter module drives one or more five-phase AC machine(s).

In such multi-phase systems, voltage command signals are applied to a pulse width modulation (PWM) module. The PWM module applies PWM waveforms to the voltage command signals to control pulse width modulation of the voltage command signals and generate switching vector signals that are provided to the PWM inverter module. The PWM waveforms are characterized by rising-edge and falling-edge transitions that occur at particular transition angles and define a particular duty cycle during each PWM period. For a pulse train having rectangular pulses, the duty cycle (DC) is the ratio of the pulse-on duration ($T_{on}$) and a corresponding PWM period ($T_{pwm}$) (i.e., time between the start of consecutive pulses) associated with that same pulse (e.g., for a pulse train in which the pulse duration is 25 microseconds and the PWM period is 100 microseconds, the duty cycle is 0.25 or 25%).

Ideally, these transition angles (i.e., the rising-edge and falling-edge transitions) of a PWM waveform will occur synchronously with respect to the electrical frequency of the machine. The terms "rising-edge" and "leading-edge" are used interchangeably herein. Likewise, the terms "falling-edge" and "trailing-edge" are used interchangeably herein.

However, these transition angles (i.e., the rising-edge and falling-edge transitions) of a PWM waveform occur asynchronously with respect to electrical frequency of the machine. In many operational scenarios (e.g., when the multi-phase machine is operating at between medium to high speed or in an overmodulation region), the transition angles do not always occur at the correct angular locations because the switching frequency of the PWM inverter module is asynchronous with the machine speed. FIG. 1 illustrates an example of switching vector signals (Sa . . . Se) that illustrates three superimposed PWM waveforms where the rising and falling-edges of the duty cycle waveforms do not occur on the correct angular positions during respective PWM periods and are offset from one another and exhibit jitter from cycle to cycle.

Although the PWM module can update/adjust the duty cycle of the PWM waveforms each time it encounters the end "boundary angle" of a current PWM period, this duty cycle is only valid with respect to transition angles that occur before it was calculated, and is not valid for transition angles that occur afterwards.

The PWM module will maintain the duty cycle that was calculated at the end of the current PWM period during the next PWM period that follows (i.e., after the previous duty cycle was calculated). In other words, the PWM module will not adjust the duty cycle of the PWM waveform, but will instead continue to apply the old previously calculated duty cycle even when a transition angle occurs in the next PWM period. For example, when a duty cycle of 100% was calculated at the end of the current PWM period, the processor will not adjust to a duty cycle of 0% when a transition angle takes place in the next PWM period (after which point a duty cycle of 0% is needed). The PWM module will continue to apply the old duty cycle of 100% for the entirety of the next PWM period, and will update the duty cycle (to 0%) only at the end of the next PWM period.

As a result, the wrong phase voltage will be applied to the machine, and therefore, phase current may not be properly regulated, which may in turn cause current/torque oscillations.

It would be desirable to provide a mechanism for ensuring that transition angles occur at their correct angular locations so that the correct phase voltage will be applied to a multi-phase machine to help maintain proper phase current regulation. Other desirable features and characteristics of the present invention will become apparent from the subsequent detailed description and the appended claims, taken in conjunction with the accompanying drawings and the foregoing technical field and background

SUMMARY

Embodiments of the present invention relate to methods, systems and apparatus for controlling operation of a multiphase machine in a vector controlled motor drive system that includes a multi-phase PWM controlled inverter module that drives the multi-phase machine when the multi-phase machine operates in an overmodulation region. The disclosed embodiments provide a mechanism for adjusting a duty cycle of PWM waveforms so that the correct phase voltage command signals are applied to the multi-phase machine. This can reduce variations/errors in the phase voltage command signals that are applied to the multi-phase machine so that phase current may be properly regulated thus reducing current/torque oscillation, which can in turn improve machine efficiency and performance, as well as utilization of the DC voltage source.

DESCRIPTION OF THE DRAWINGS

Embodiments of the present invention will hereinafter be described in conjunction with the following drawing figures, wherein like numerals denote like elements.

FIG. 3C is a table that summarizes different combinations of on/off states of switching vector signals that are used to represent each voltage switching vector that is shown in FIGS. 3A and 3B;

DESCRIPTION OF EXEMPLARY EMBODIMENTS

Figure 1:
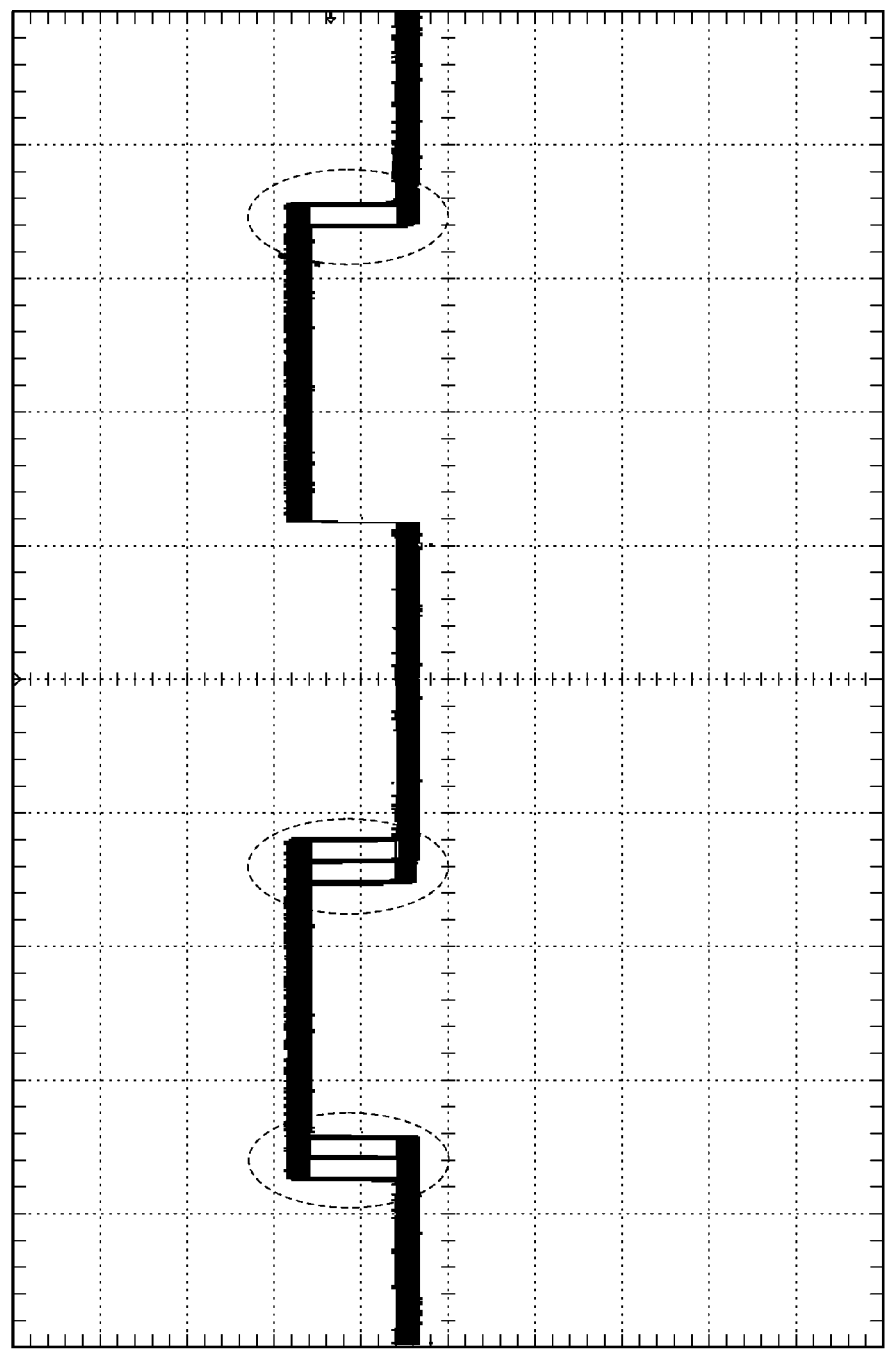
FIG. 1 illustrates an example of switching vector signals (Sa . . . Se) that illustrates three superimposed PWM waveforms.

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary or the following detailed description.

Before describing in detail embodiments that are in accordance with the present invention, it should be observed that the embodiments reside primarily in combinations of method steps and apparatus components related to controlling operation of a multi-phase system. It will be appreciated that embodiments of the invention described herein can be implemented using hardware, software or a combination thereof. The control circuits described herein may comprise various components, modules, circuits and other logic which can be implemented using a combination of analog and/or digital circuits, discrete or integrated analog or digital electronic circuits or combinations thereof. As used herein the term "module" refers to a device, a circuit, an electrical component, and/or a software based component for performing a task. In some implementations, the control circuits described herein can be implemented using one or more application specific integrated circuits (ASICs), one or more microprocessors, and/or one or more digital signal processor (DSP) based circuits when implementing part or all of the control logic in such circuits. It will be appreciated that embodiments of the invention described herein may be comprised of one or more conventional processors and unique stored program instructions that control the one or more processors to implement, in conjunction with certain non-processor circuits, some, most, or all of the functions for controlling operation of a multi-phase system, as described herein. As such, these functions may be interpreted as steps of a method for controlling operation of a multi-phase system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions will be described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Overview

Embodiments of the present invention relate to methods, systems and apparatus for overmodulation in a multi-phase system. The disclosed methods, systems and apparatus for controlling operation of a multi-phase system and regulating current provided to a multi-phase machine can be implemented in operating environments such as a hybrid/electric vehicle (HEV). In the exemplary implementations which will now be described, the control techniques and technologies will be described as applied to a hybrid/electric vehicle. However, it will be appreciated by those skilled in the art that the same or similar techniques and technologies can be applied in the context of other systems in which it is desirable to control operation of a multi-phase system and regulate current provided to a multi-phase machine in that system when one or more phases has experienced a fault or failed. In this regard, any of the concepts disclosed here can be applied generally to "vehicles," and as used herein, the term "vehicle" broadly refers to a non-living transport mechanism having an AC machine. In addition, the term "vehicle" is not limited by any specific propulsion technology such as gasoline or diesel fuel. Rather, vehicles also include hybrid vehicles, battery electric vehicles, hydrogen vehicles, and vehicles which operate using various other alternative fuels.

As used herein, the term "alternating current (AC) machine" generally refers to "a device or apparatus that converts electrical energy to mechanical energy or vice versa." AC machines can generally be classified into synchronous AC machines and asynchronous AC machines. Synchronous AC machines can include permanent magnet machines and reluctance machines. Permanent magnet machines include surface mount permanent magnet machines (SMPMMs) and interior permanent magnet machines (IPMMs). Asynchronous AC machines include induction machines. Although an AC machine can be an AC motor (e.g., apparatus used to convert AC electrical energy power at its input to produce to mechanical energy or power), an AC machine is not limited to being an AC motor, but can also encompass generators that are used to convert mechanical energy or power at its prime mover into electrical AC energy or power at its output. Any of the machines can be an AC motor or an AC generator. An AC motor is an electric motor that is driven by an alternating current. In some implementations, an AC motor includes an outside stationary stator having coils supplied with alternating current to produce a rotating magnetic field, and an inside rotor attached to the output shaft that is given a torque by the rotating field. Depending on the type of rotor used, AC motors can be classified as synchronous or asynchronous.

Figure 2A:
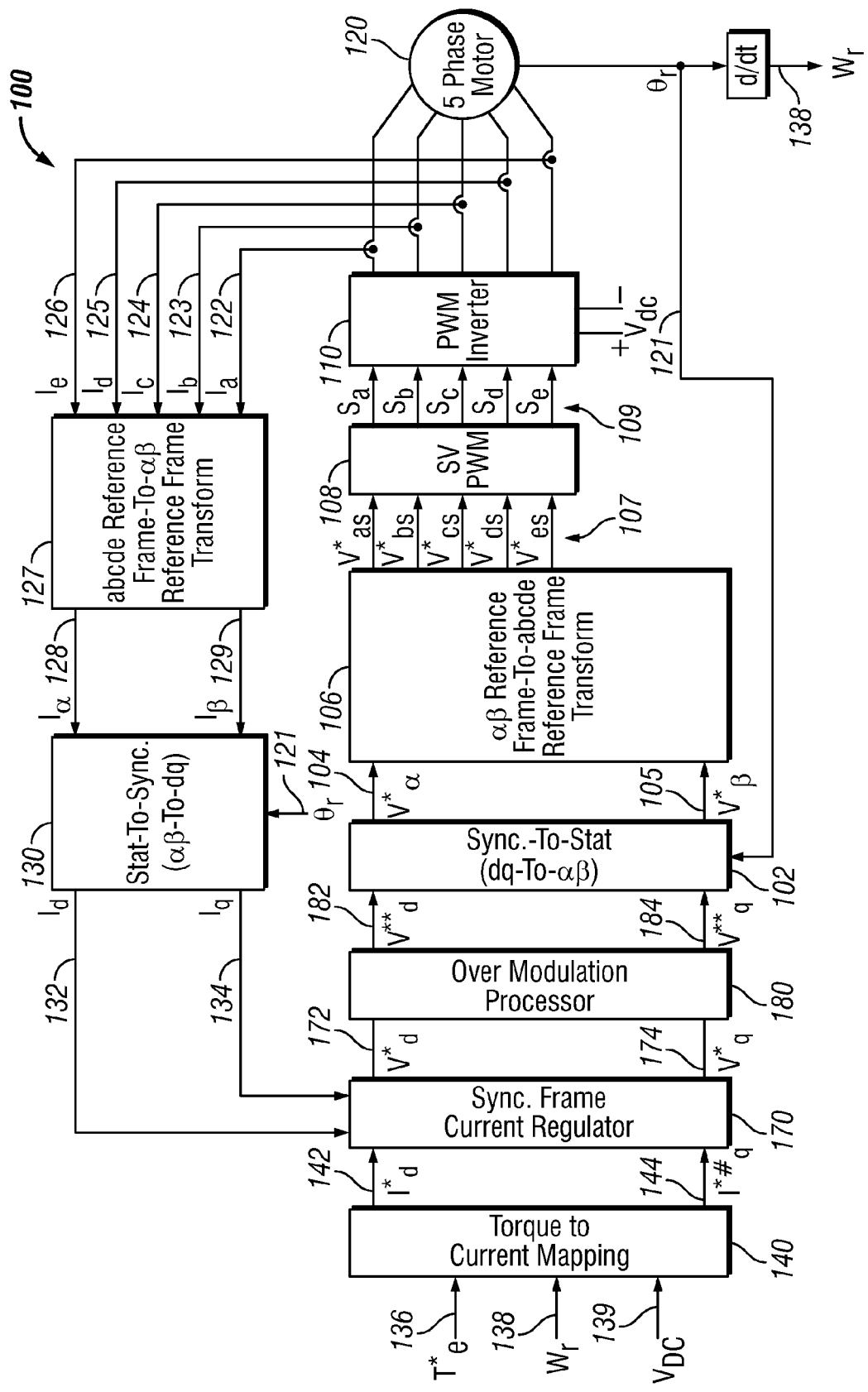
FIG. 2A is a block diagram of one example of a vector controlled motor drive system in accordance with some of the disclosed embodiments.

FIG. 2A is a block diagram of one example of a vector controlled motor drive system 100 in accordance with the disclosed embodiments. The system 100 controls a five-phase AC machine 120 via a five-phase pulse width modulated (PWM) inverter module 110 coupled to the five-phase AC machine 120 so that the five-phase AC machine 120 can efficiently use a DC input voltage (Vdc) provided to the five-phase PWM inverter module 110 by adjusting current commands that control the five-phase AC machine 120. In one particular implementation, the vector controlled motor drive system 100 can be used to control torque in an HEV.

In the following description of one particular non-limiting implementation, the five-phase AC machine 120 is described as a five-phase AC powered motor 120, and in particular a five-phase, permanent magnet synchronous AC powered motor (or more broadly as a motor 120); however, it should be appreciated that the illustrated embodiment is only one non-limiting example of the types of AC machines that the disclosed embodiments can be applied to, and further that the disclosed embodiments can be applied to any type of multi-phase AC machine that includes five or more phases.

The five-phase AC motor 120 is coupled to the five-phase PWM inverter module 110 via five inverter poles and generates mechanical power (Torque X Speed) based on five-phase sinusoidal current signals received from the PWM inverter module 110. In some implementations, the angular position of a rotor (θr) of the five-phase AC motor 120 or "shaft position" is measured using a position sensor (not illustrated), and in other implementations, the angular position of a rotor (θr) of the five-phase AC motor 120 can be estimated without using a position sensor by using sensorless position estimation techniques.

Figure 2B:
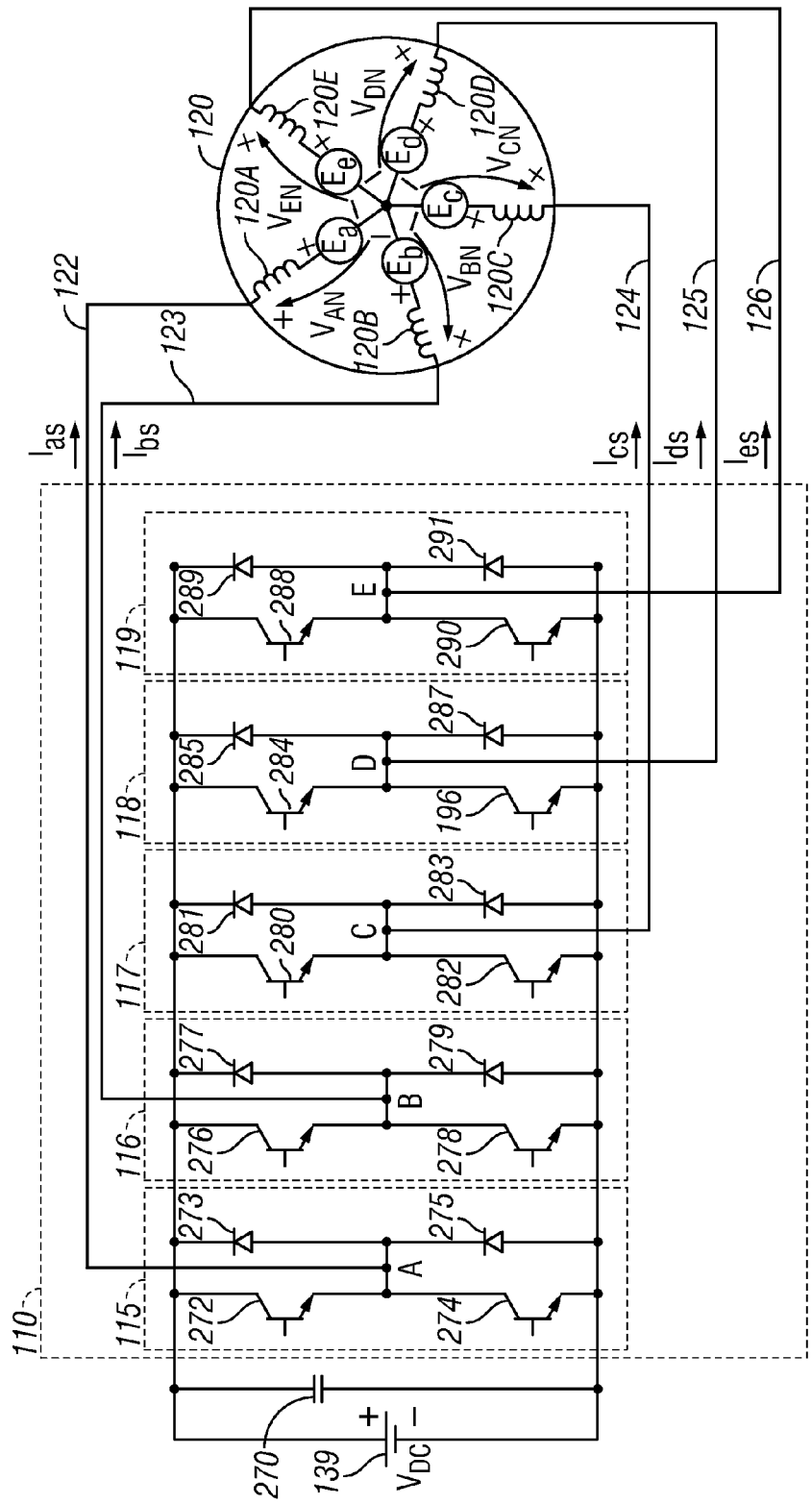
FIG. 2B is a block diagram of a portion of a motor drive system including a five-phase voltage source inverter module connected to a five-phase AC motor.

Prior to describing operation details of the system 100, a more detailed description of one exemplary implementation of the five-phase voltage source inverter 110 will be provided (including how it is connected to the five-phase AC motor 120) with reference to FIG. 2B.

FIG. 2B is a block diagram of a portion of a motor drive system including a five-phase voltage source inverter 110 connected to a five-phase AC motor 120. It should be noted that the five-phase voltage source inverter 110 and the five-phase motor 120 in FIG. 2A are not limited to this implementation; rather, FIG. 2B is merely one example of how the five-phase voltage source inverter 110 and the five-phase motor 120 in FIG. 2A could be implemented in one particular embodiment.

As illustrated in FIG. 2B, the five-phase AC motor 120 has five stator or motor windings 120a, 120b, 120c, 120d, 120e connected to motor terminals A, B, C, D, E, and the five-phase PWM inverter module 110 includes a capacitor 270 and five inverter sub-modules 115-119. In this particular embodiment, in phase A the inverter sub-module 115 is coupled to motor winding 120a, in phase B the inverter sub-module 116 is coupled to motor winding 120b, in phase C the inverter sub-module 117 is coupled to motor winding 120c, in phase D the inverter sub-module 118 is coupled to motor winding 120d, and in phase E the inverter sub-module 119 is coupled to motor winding 120e. The motor windings A, B, C, D, E (120a, 120b, 120c, 120d, 120e) that are coupled together at a neutral point (N). The current into motor winding A 120a flows out motor windings B-E 120b-120e, the current into motor winding B 120b flows out motor windings A, C, D, E 120a and 120c-e, the current into motor winding C 120c flows out motor windings A, B, D, E 120a, 120b, 120d, 120e, the current into motor winding D 120d flows out motor windings A, B, C, E 120a-c and 120e and the current into motor winding E 120e flows out motor windings A-D 120a-d.

The resultant phase or stator currents (Ia-Ie) 122, 123, 124, 125, 126 flow through respective stator windings 120a-e. The phase to neutral voltages across each of the stator windings 120a-120e are respectively designated as $V_{an}$, $V_{bn}$, $V_{cn}$, $V_{dn}$, $V_{en}$, with the back electromotive force (EMF) voltages generated in each of the stator windings 120a-120e respectively shown as the voltages $E_a$, $E_b$, $E_c$, $E_d$, $E_e$ produced by ideal voltage sources, each respectively shown connected in series with stator windings 120a-120e. As is well known, these back EMF voltages $E_a$, $E_b$, $E_c$, $E_d$, $E_e$ are the voltages induced in the respective stator windings 120a-120e by the rotation of the permanent magnet rotor. Although not shown, the motor 120 is coupled to a drive shaft.

The inverter 110 includes a capacitor 270, a first inverter sub-module 115 comprising a dual switch 272/273, 274/275, a second inverter sub-module 116 comprising a dual switch 276/277, 278/279, a third inverter sub-module 117 comprising a dual switch 280/281, 282/283, a fourth inverter sub-module 118 comprising a dual switch 284/285, 286/287, and a fifth inverter sub-module 119 comprising a dual switch 288/289, 290/291. As such, inverter 110 has ten solid state controllable switching devices 272, 274, 276, 278, 280, 282, 284, 286, 288, 290 and ten diodes 273, 275, 277, 279, 281, 283, 285, 287, 289, 291 to appropriately switch compound voltage ($V_{AC}$) and provide five-phase energization of the stator windings 120a, 120b, 120c, 120d, 120e of the five-phase AC motor 120.

Although not illustrated, a closed loop motor controller can receive motor command signals and motor operating signals from the motor 120, and generate control signals for controlling the switching of solid state switching devices 272, 274, 276, 278, 280, 282, 284, 286, 288, 290 within the inverter sub-modules 115-128. Examples of these switching vectors used to construct these control signals will be described below. By providing appropriate control signals to the individual inverter sub-modules 115-119, the closed loop motor controller controls switching of solid state switching devices 272, 274, 276, 278, 280, 282, 284, 286, 288, 290 within the inverter sub-modules 115-119 and thereby control the outputs of the inverter sub-modules 115-119 that are provided to motor windings 120a-120e, respectively. The resultant stator currents (Ia . . . Ie) 122-126 that are generated by the inverter sub-modules 115-119 of the five-phase inverter module 110 are provided to motor windings 120a, 120b, 120c, 120d, 120e. The voltages as $V_{an}$, $V_{bn}$, $V_{cn}$, $V_{dn}$, $V_{en}$, $E_a$, $E_b$, $E_c$, $E_d$, $E_e$ and the voltage at node N fluctuate over time depending on the open/close states of switches 272, 274, 276, 278, 280, 282, 284, 286, 288, 290 in the inverter sub-modules 115-119 of the inverter module 110, as will be described below.

Referring again to FIG. 2A, the vector control motor drive system 100 includes a torque-to-current mapping module 140, a synchronous (SYNC.) frame current regulator module 170, an overmodulation preprocessor 180, a synchronous-to-stationary (SYNC.-TO-STAT.) transformation module 102, an αβ reference frame-to-abcde reference frame (αβ-to-abcde) transformation module 106, a Space Vector (SV) PWM module 108, a five-phase PWM inverter 110, an abcde reference frame-to-αβ reference frame (abcde-to-αβ transformation module 127, a stationary-to-synchronous (STAT.-TO-SYNC.) transformation module 130.

The torque-to-current mapping module 140 receives a torque command signal (Te*) 136, angular rotation speed (ωr) 138 of the shaft that is generated based on the derivative of the rotor/shaft position output (θr) 121, and the DC input voltage ($V_{DC}$) 139 as inputs, along with possibly a variety of other system parameters depending upon implementation. The torque-to-current mapping module 140 uses these inputs to generate a d-axis current command (Id*) 142 and a q-axis current command (Iq*) 144 that will cause the motor 120 to generate the commanded torque (Te*) at speed (ωr) 138. In particular, the torque-to-current mapping module 140 uses the inputs to map the torque command signal (Te*) 136 to a d-axis current command signal (Id*) 142 and a q-axis current command signal (Iq*) 144. The synchronous reference frame d-axis and q-axis current command signals (Id*, Iq*) 142, 144 are DC commands that have a constant value as a function of time.

The abcde-to-αβ transformation module 127 receives the measured five-phase stationary reference frame feedback stator currents (Ia . . . Ie) 122-126 that are fedback from motor 120. The abcde-to-αβ transformation module 127 uses these five-phase stationary reference frame feedback stator currents 122-126 to perform an abcde reference frame-to-αβ reference frame transformation to transform the five-phase stationary reference frame feedback stator currents 122-126 into stationary reference frame feedback stator currents (Iα, Iβ) 128, 129. The abcde-to-αβ transformation can be performed using any known transformation technique including using the matrices defined in equation (1) below.

$$\begin{bmatrix} I_\alpha \\ I_\beta \\ I_0 \end{bmatrix} = \frac{2}{5} \begin{bmatrix} 1 & \cos\left(\frac{2\pi}{5}\right) & \cos\left(\frac{4\pi}{5}\right) & \cos\left(\frac{6\pi}{5}\right) & \cos\left(\frac{8\pi}{5}\right) \\ 0 & \sin\left(\frac{2\pi}{5}\right) & \sin\left(\frac{4\pi}{5}\right) & \sin\left(\frac{6\pi}{5}\right) & \sin\left(\frac{8\pi}{5}\right) \\ \frac{1}{\sqrt{2}} & \frac{1}{\sqrt{2}} & \frac{1}{\sqrt{2}} & \frac{1}{\sqrt{2}} & \frac{1}{\sqrt{2}} \end{bmatrix} \times \begin{bmatrix} I_a \\ I_b \\ I_c \\ I_d \\ I_e \end{bmatrix} \quad (1)$$

In equation (1) the column vector that represents the five-phase stationary reference frame feedback stator currents 122-126 is multiplied by a transformation matrix and scaling factor to generate a column vector that represents the stationary reference frame feedback stator currents (Iα, Iβ) 128, 129.

The stationary-to-synchronous transformation module 130 receives the stationary reference frame feedback stator currents (Iα, Iβ) 128, 129 and the rotor angular position (θr) 121 and generates (e.g., processes or converts) these stationary reference frame feedback stator currents (Iα, Iβ) 128, 129 to generate a synchronous reference frame d-axis current signal (Id) 132 and a synchronous reference frame q-axis current signal (Iq) 134. The process of stationary-to-synchronous conversion is well-known in the art and for sake of brevity will not be described in detail.

The synchronous frame current regulator module 170 receives the synchronous reference frame d-axis current signal (Id) 132, the synchronous reference frame q-axis current signal (Iq) 134, the d-axis current command (Id*) 142 and the q-axis current command (Iq*) 144, and uses these signals to generate a synchronous reference frame d-axis voltage command signal (Vd*) 172 and a synchronous reference frame q-axis voltage command signal (Vq*) 174. The synchronous reference frame voltage command signals (Vd*, Vq*) 172, 174 are DC commands that have a constant value as a function of time for steady state operation. Because the current commands are DC signals in the synchronous reference frame they are easier to regulate in comparison to AC stationary reference frame current commands. The process of current to voltage conversion can be implemented as a Proportional-Integral (PI) controller, which is known in the art and for sake of brevity will not be described in detail.

The overmodulation preprocessor 180 receives the synchronous reference frame d-axis voltage command signal (Vd*) 172 and the synchronous reference frame q-axis voltage command signal (Vq*) 174. The overmodulation preprocessor 180 processes these voltage command signals 172, 174 to generate a modified synchronous reference frame d-axis voltage command signal (Vd) 182 and a modified synchronous reference frame q-axis voltage command signal (Vq) 184. The modified voltage command signals (Vd, Vq) 182, 184 are optimized such that output voltage signals generated by the inverter module 110 can be increased via overmodulation. The processing performed by the overmodulation preprocessor 180 is described in detail in U.S. patent application Ser. No. 12/722,166, filed Mar. 11, 2010, entitled "METHODS, SYSTEMS AND APPARATUS FOR OVERMODULATION OF A FIVE-PHASE MACHINE," and assigned to the assignee of the present invention, which is incorporated herein by reference in its entirety.

The synchronous-to-stationary transformation module 102 receives the modified voltage command signals (Vd, Vq) 182, 184 as inputs along with the rotor position output (θr) 121. In response to the modified voltage command signals (Vd, Vq) 182, 184 and the measured (or estimated) rotor position angle (θr) 121, the synchronous-to-stationary transformation module 102 performs a dq-to-αβ transformation to generate an α-axis stationary reference frame voltage command signal (Vα*) 104 and a β-axis stationary reference frame voltage command signal (Vβ*) 105. The stationary reference frame α-axis and β-axis voltage command signals (Vα*, Vβ*) 104, 105 are in the stationary reference frame and therefore have values that vary as a sine wave as a function of time. The process of synchronous-to-stationary conversion is well-known in the art and for sake of brevity will not be described in detail.

The αβ-to-abcde transformation module 106 receives the stationary reference frame voltage command signals (Vα*, Vβ*) 104, 105, and based on these signals, generates stationary reference frame voltage command signals (Vas* ... Ves*) 107 (also referred to as "phase voltage signals" or "phase voltage command signals") that are sent to the Space Vector (SV) PWM module 108. The αβ-to-abcde transformation can be performed using any known transformation technique including using the matrices defined in equation (2) below.

$$\begin{bmatrix} V_a \\ V_b \\ V_c \\ V_d \\ V_e \end{bmatrix} = \begin{bmatrix} 1 & 0 & \frac{1}{\sqrt{2}} \\ \cos\left(\frac{2\pi}{5}\right) & \sin\left(\frac{2\pi}{5}\right) & \frac{1}{\sqrt{2}} \\ \cos\left(\frac{4\pi}{5}\right) & \sin\left(\frac{4\pi}{5}\right) & \frac{1}{\sqrt{2}} \\ \cos\left(\frac{6\pi}{5}\right) & \sin\left(\frac{6\pi}{5}\right) & \frac{1}{\sqrt{2}} \\ \cos\left(\frac{8\pi}{5}\right) & \sin\left(\frac{8\pi}{5}\right) & \frac{1}{\sqrt{2}} \end{bmatrix} \times \begin{bmatrix} V_\alpha \\ V_\beta \\ V_0 \end{bmatrix} \quad (2)$$

In equation (2) the column vector that represents the stationary reference frame voltage command signals (Vα*, Vβ*) 104, 105 is multiplied by a transformation matrix and scaling factor to generate a column vector that represents the stationary reference frame voltage command signals (Vas* ... Ves*) 107 (or "phase voltage command signals").

The five-phase PWM inverter module 110 is coupled to the SVPWM module 108. The SVPWM module 108 is used for the control of pulse width modulation (PWM) of the phase voltage command signals (Vas* ... Ves*) 107. The switching vector signals (Sa ... Se) 109 are generated based on duty cycle waveforms (e.g., FIG. 8) that are not illustrated in FIG. 2A, but are instead internally generated at the SVPWM module 108 to have a particular duty cycle during each PWM period. In accordance with the disclosed embodiments, the duty cycle waveforms (not illustrated in FIG. 2A) can be compensated or adjusted at the Space Vector (SV) PWM module 108 so that the correct phase voltage command signals (Vas* ... Ves*) 107 are applied in each PWM sector. The SVPWM module 108 modifies the phase voltage command signals (Vas* ... Ves*) 107 based on the duty cycle waveforms (not illustrated in FIG. 2A) to generate switching vector signals (Sa ... Se) 109, which it provides to the five-phase PWM inverter module 110. The particular SV modulation algorithm implemented in the SV PWM module 108 can be any known SV modulation algorithm.

The switching vector signals (Sa ... Se) 109 control the switching states of switches in PWM inverter 110 to generate five-phase voltage commands at each phase A, B, C, D, E. The switching vector signals (Sa ... Se) 109 are PWM waveforms that have a particular duty cycle during each PWM period that is determined by the duty cycle waveforms (e.g., FIG. 8) that are internally generated at the SVPWM module 108. The five-phase PWM inverter module 110 receives the DC input voltage (Vdc) and switching vector signals (Sa ... Se) 109, and uses them to generate five-phase alternating current (AC) voltage signal waveforms at inverter poles that drive the five-phase AC machine 120 at varying speeds (ωr).

The five-phase interior permanent magnet synchronous machine 120 receives the five-phase voltage signals generated by the PWM inverter 110 and generates a motor output at the commanded torque Te* 136. In this particular implementation, the machine 120 comprises a five-phase interior permanent-magnet synchronous motor (IPMSM) 120, but can be any five-phase AC machine.

Although not illustrated in FIG. 2A, the system 100 may also include a gear coupled to and driven by a shaft of the five-phase AC machine 120. The measured feedback stator currents (Ia-Ie) are sensed, sampled and provided to the abcde-to-αβ transformation module 127 as described above.

Voltage Switching Vectors

Space Vector Pulse Width Modulation (SVPWM) techniques are implemented at the SVPWM module 108 and inverter module 110 to control of pulse width modulation (PWM) to create alternating current (AC) waveforms that drive the five-phase AC powered machine 120 at varying speeds based on the DC input 139.

Figure 3A:
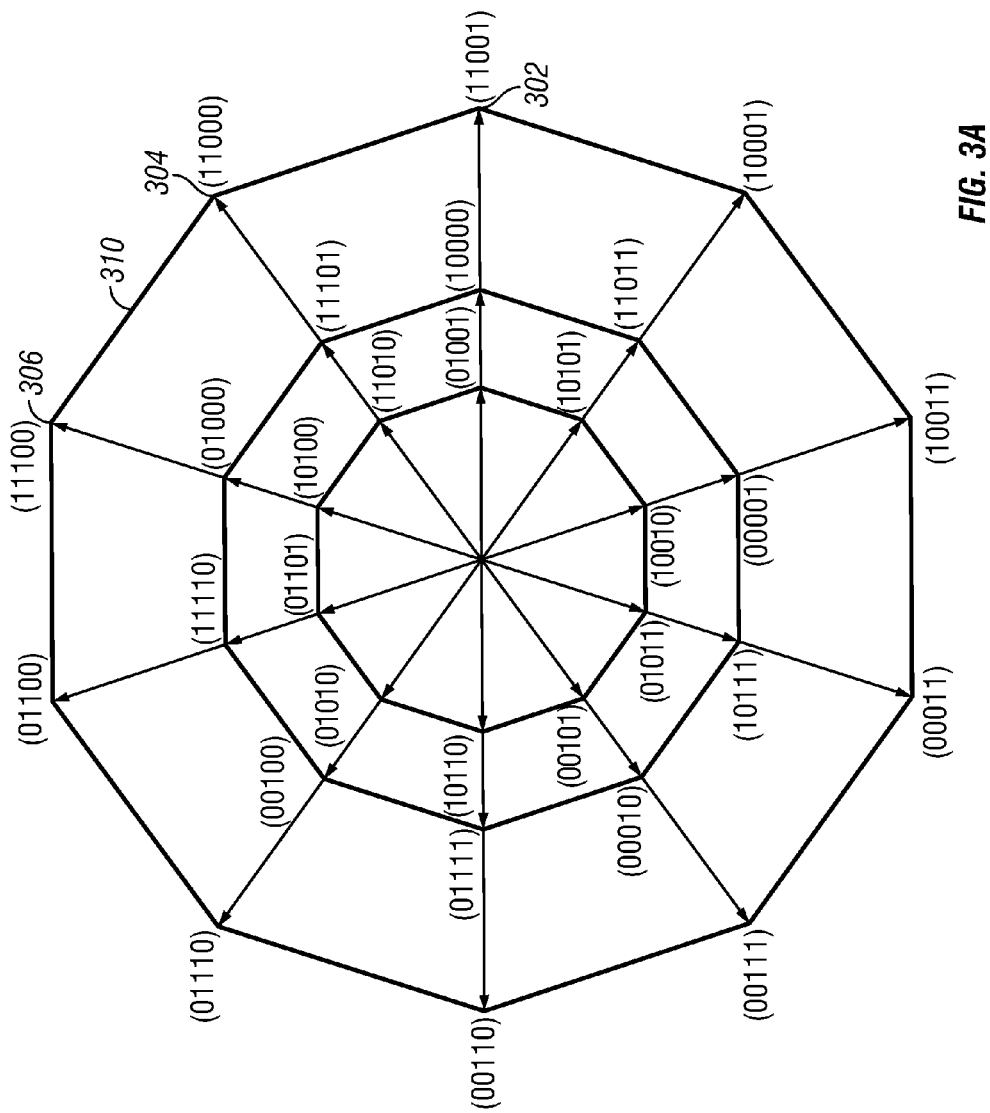
FIGS. 3A and 3B are representations of a state space voltage switching vector diagram that illustrate thirty of thirty-two voltage switching vectors for driving switches in a five-phase inverter module.
Figure 3B:
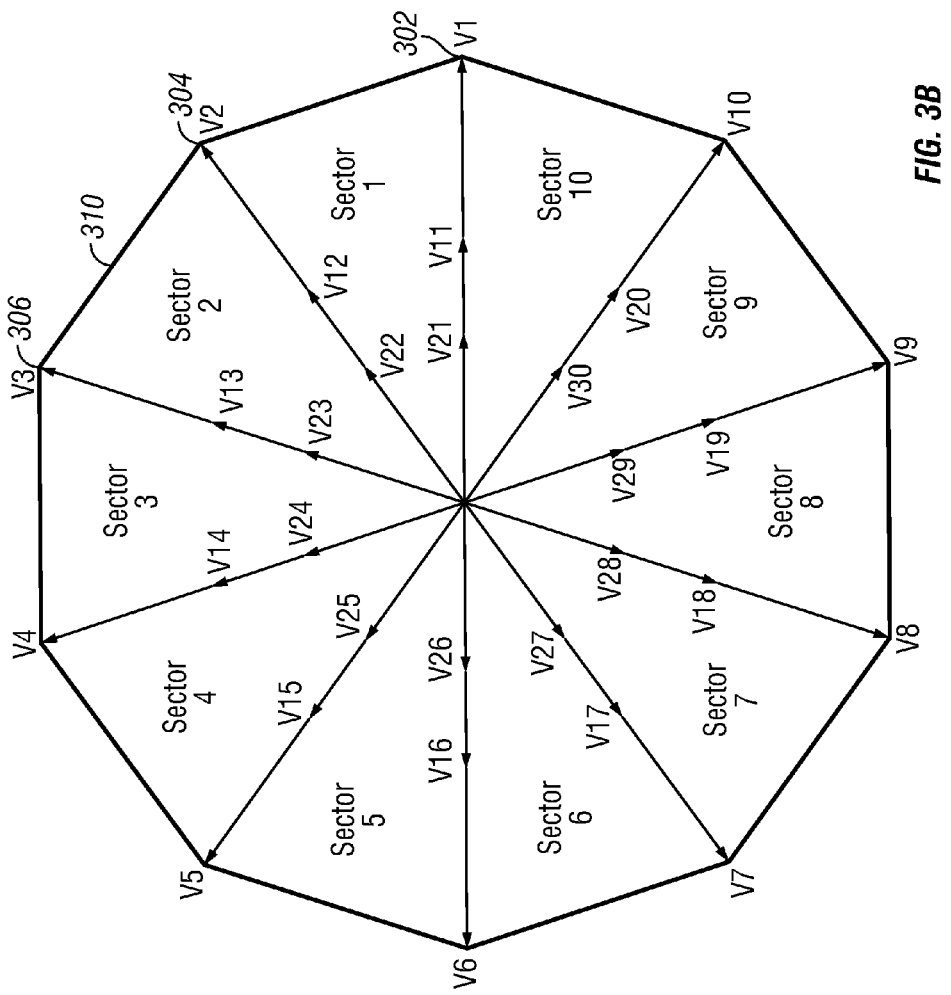

FIGS. 3A and 3B are representations of a state space voltage switching vector diagram that illustrate thirty of thirty-two "state space" voltage switching vectors (V1 ... V30) for driving switches in a five-phase inverter module 110. FIG. 3C is a table that summarizes different combinations of on/off (0/1) states of switching vector signals (Sa ... Se) 109 that are used to represent each voltage switching vector that is shown in FIGS. 3A and 3B. As described above, the switching states of switches in PWM inverter 110 are controlled using switching vector signals (Sa ... Se) 109 to generate five-phase stationary reference frame feedback stator currents 122-126. The five-phase voltage source inverter module 110 must be controlled so that at no time are both switches in the same inverter sub-module 115-119 or "leg" are turned on to prevent the DC supply from being shorted. As such, the switches in the same inverter sub-module 115-119 are operated such that when one is off the other is on and vice versa. As illustrated in FIG. 3A and as summarized in FIG. 3C, this leads to thirty-two possible voltage switching vectors for the inverter 110 with thirty active voltage switching vectors (V1 through V30) and two zero voltage switching vectors (V0 and V31). Each voltage switching vector (V0 ... V31) is used to represent the switching status of switches of the five-phase voltage source inverter 110 in FIG. 2B. In other words, each of the thirty-two voltage switching vectors (V0 ... V31) represents a different combination of possible switch states of the switches in the five-phase voltage source inverter 110.

To explain further, in a given phase (A ... E) at any particular time, one of the switches is off and the other one of the switches is on (i.e., the two switches in a particular inverter sub-module must have opposite on/off states). For instance, as one example with respect to phase A, when switch 272 is on, switch 274 is off, and vice-versa.

As such, for a particular inverter sub-module, the on/off status of the two switches in that inverter sub-module can be represented as a binary 1 or binary 0. For example, when the upper switch in a given phase is on (and the lower switch is off) the value of a bit will be one (1), and when the lower switch in a given phase is on (and the upper switch is off) the value of a bit will be zero (0). For instance, as an example with respect to phase A, when the upper switch 272 is on (and the lower switch 274 is off) the value of the first bit (from left to right) will be one (1).

Accordingly, in FIG. 3A, each of the active voltage switching vectors (V1 ... V30) is illustrated along with a corresponding five bit binary number in the parenthesis next to that active voltage switching vector. In FIG. 3B, each voltage switching vector identifier (V1 ... V30) has an identifier that identifies a corresponding switch state associated with the particular voltage switching vectors. The first bit (from left to right) represents the state of the switches 272, 274 for inverter sub-module 115 for phase A, the second bit (from left to right) represents the state of the switches 276, 278 for inverter sub-module 116 for phase B, the third bit (from left to right) represents the state of the switches 280, 282 for inverter sub-module 117 for phase C, and so on.

Thus, the active voltage switching vector (V1) represents a case when, with respect to phase A, the upper switch 272 is on (and the lower switch 274 is off) and the value of the first bit (from left to right) will be one (1); with respect to phase B, the upper switch 276 is on (and the lower switch 278 is off) and the value of the second bit (from left to right) will be one (1), with respect to phase C; the upper switch 280 is off (and the lower switch 282 is on) and the value of the third bit (from left to right) will be zero (0), with respect to phase D; the upper switch 284 is off (and the lower switch 286 is on) and the value of the fourth bit (from left to right) will be zero (0), and with respect to phase E; the upper switch 278 is on (and the lower switch 290 is off) and the value of the fifth bit (from left to right) will be one (1). Hence, the active voltage switching vector (V1) has a corresponding switch state bit pattern (11001). In other words, the switch state represented by voltage switching vector (V1) is (11001), meaning phases A, B, E are high, while phases C and D are low.

The zero voltage switching vector (V0) represents a switching scenario where, with respect to phases A-E, all of the upper switches are off (and all of the lower switches are on). Hence, the zero voltage switching vector (V0) has a corresponding switch state bit pattern (00000), which indicates that all of the upper switches in all five phases A-E are off and that all of the lower switches in all five phases A-E are on. Similarly, the zero voltage switching vector (V31) has a corresponding switch state bit pattern (11111), which indicates that all of the upper switches in all five phases A-E are on and that all of the lower switches in all five phases A-E are off.

Figure 4:
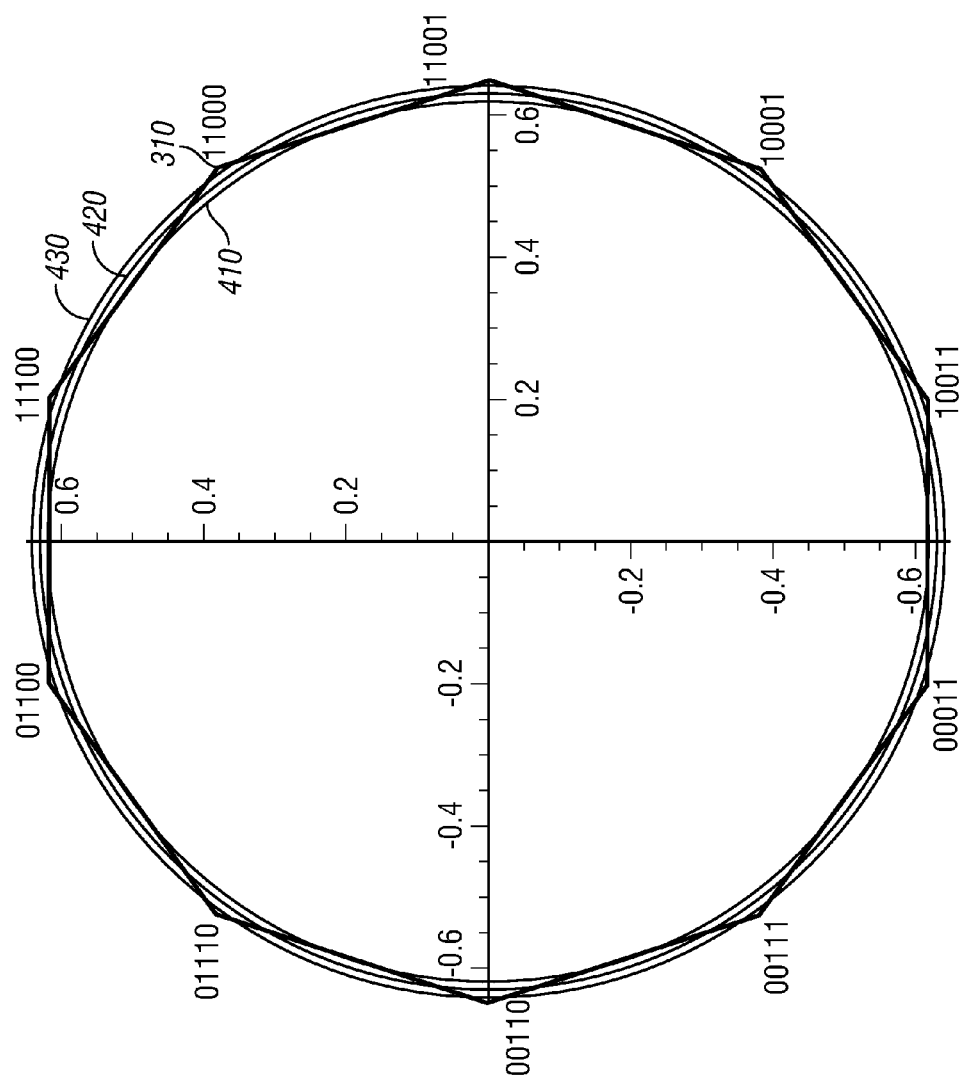
FIG. 4 is a diagram that illustrates a decagon region formed by joining ten large voltage switching vectors normalized to DC link voltage and three distinct modulation regions.

As indicated in FIG. 3B, the voltage switching vector diagram includes ten (10) sectors with sector numbers (1 ... 10) increasing in the counter-clockwise direction. Each of the sectors (1 ... 10) is defined between two of the ten active voltage switching vectors (V1 through V10). These ten sectors are used to control the switching of switches in the PWM inverter 110 to control the current in the motor 120 based on the operating conditions. FIG. 4 is a diagram that illustrates a decagon region formed by joining ten large voltage switching vectors normalized to DC link voltage and three distinct modulation regions. As illustrated in FIG. 4, only the ten large voltage switching vectors (i.e., V1, V2, V3, V4, V5, V6, V7, V8, V9, V10) and the zero voltage switching vectors (V0, V31) are utilized to maximize fundamental output voltage for a given DC link voltage. As will be described further below, in each PWM cycle, the two most adjacent active voltage switching vectors (i.e., those bounding the sector) for any particular sector and the two zero voltage switching vectors (V0, V31) are used to generate PWM waveforms called modified switching vector signals (Sa ... Se) 109 (FIG. 2A) for phases A ... E, respectively. The switching vector signals (Sa ... Se) 109 are provided to the gates of the switches in the five-phase voltage source inverter 110 in FIG. 2B to control switching of these switches.

As is also illustrated in FIGS. 3A, 3B and 4, when the ten large voltage switching vectors (i.e., V1, V2, V3, V4, V5, V6, V7, V8, V9, V10) are joined via lines, this forms a decagon region 310.

FIG. 4 further illustrates that the decagon region 310 defines three distinct modulation regions 410, 420, 430 (indicated via circles) that will be referred to below as a linear modulation region 410, a first overmodulation region 420, and a second overmodulation region 430. Similar modulation regions are defined amongst any combination of two large voltage switching vectors. Each of the modulation regions 410, 420, 430 will be described in greater detail below with reference to FIG. 5A, which illustrates a blown up view of sector numbers 1-3.

Figure 5A:
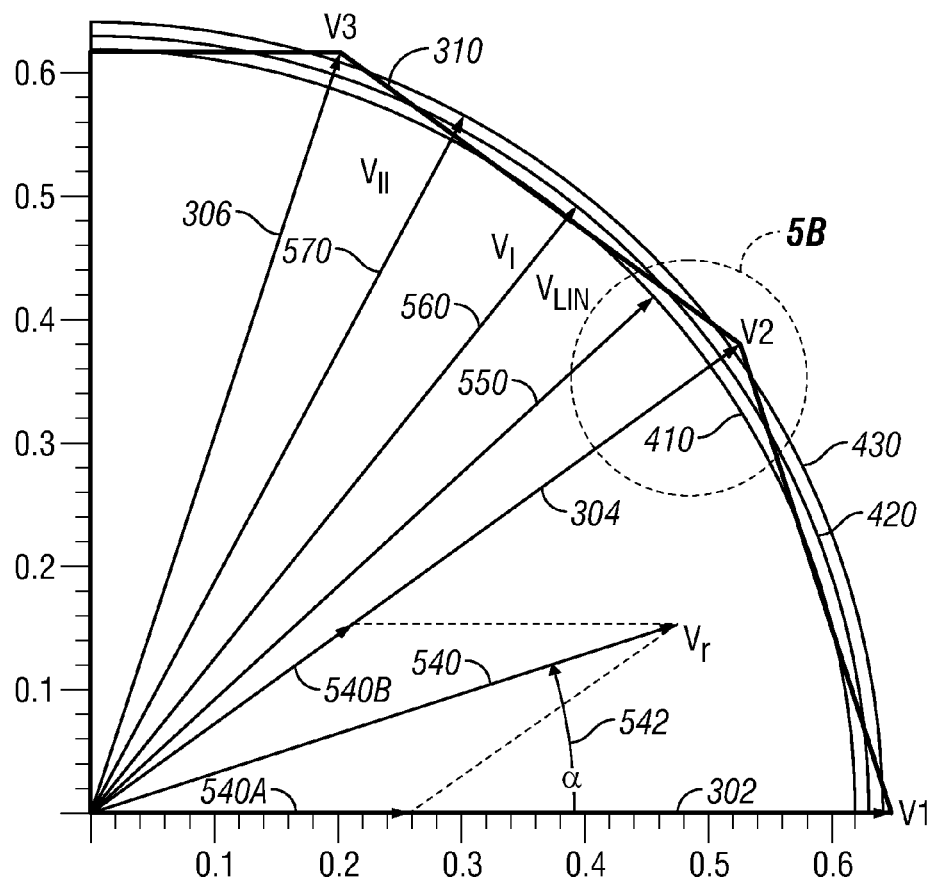
FIG. 5A is a blown up view of sector numbers of FIG. 4 that illustrates modulation regions of FIG. 4 in greater detail.
Figure 5B:
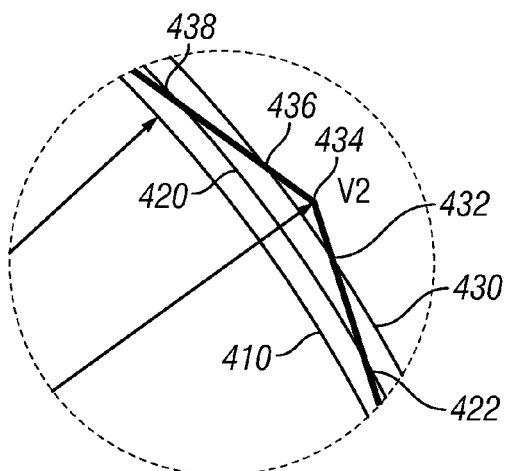
FIG. 5B is a blown up view of modulation regions of FIG. 5A in greater detail.

FIG. 5A is a blown up view of sector numbers 1-3 of FIG. 4 that illustrates modulation regions and 410, 420, 430 in greater detail. In addition, FIG. 5A also illustrates a reference voltage vector having a magnitude (Vr) 540 and angle (α) 542, a linear region voltage threshold (Vlin) 550 for a linear modulation region 410, a first voltage threshold (VI) 560 for a first overmodulation region 420, a second voltage threshold (VII) 570 for a second overmodulation region 430, and switching vectors V1 (302), V2 (304), and V3 (306). FIG. 5B is a blown up view of modulation regions 410, 420, 430 of FIG. 5A in greater detail and shows intersection points 422, 432, 434, 436, 438 between the decagon region 310 and the linear modulation region 410, the first overmodulation region 420, and the second overmodulation region 430.

Performance of PWM can be characterized by modulation index (MI), which can be defined as a normalized fundamental reference voltage. As used herein, "modulation index (MI)" is the ratio of the peak fundamental phase voltage (Vr) to the maximum available voltage. The MI can be defined via the equation $$MI = \frac{V_r}{V_{dc}} \cdot \frac{\pi}{2},$$

where $$V_r = \sqrt{V_d^2 + V_q^2},$$

and Vd and Vq are the d-axis voltage command signal (Vd*) 172 and the q-axis voltage command signal (Vq*) 174 that are output by current controller 170. The range of modulation index is from 0 to 1.

In the first sector (sector 1) between V1 and V2, the magnitude (Vr) of the reference voltage vector can be represented in equation (3) as a function of time as follows:

$$V_r T_{pwm} = V_1 t_1 + V_2 t_2 + V_0 (T_{pwm} - t_1 - t_2) \quad (3)$$

where V1 is the large voltage switching vector (V1) which has a corresponding switch state bit pattern (11001), V2 is the large voltage switching vector (V2) which has a corresponding switch state bit pattern (11000), and V0 is the zero voltage switching vector (V0) which has a corresponding switch state bit pattern (00000). The time (t1) is the time duration that the large voltage switching vector (V1) is used to generate the reference voltage vector, the time (t2) is the time duration that that the large voltage switching vector (V2) is used to generate the reference voltage vector, and the period ($T_{pwm}$) is the fundamental pulse width modulation period. The time period $T_{pwm} - t_1 - t_2$ is the time duration that the zero voltage switching vector (V0) is used to generate the reference voltage vector. These times will be described in greater detail below with respect to each modulation region.

The large voltage switching vector (V1) has a magnitude that can be represented in equation (4) as a function of the DC link voltage (Vdc) as follows:

$$V_1 = \left(\frac{1}{5} + \frac{1}{\sqrt{5}}\right)V_{dc} \quad (4)$$

The large voltage switching vector (V2) can be represented in equation (5) as a function of the large voltage switching vector (V1) as follows:

$$V_2 = V_1 e^{j\frac{\pi}{5}} \quad (5)$$

The linear region voltage threshold (Vlin) 550 for the linear modulation region 410 has a magnitude that can be represented in equation (6) as a function of the large voltage switching vector (V1) and the DC link voltage (Vdc) as follows:

$$V_{lin} = V_1 \cos\left(\frac{\pi}{10}\right) = \frac{\sqrt{5+2\sqrt{5}}}{5} V_{dc} \quad (6)$$

The first voltage threshold (VI) 560 for the first overmodulation region 420 has a magnitude that can be represented in equation (7) as a function of the DC link voltage (Vdc) as follows:

$$V_I = \frac{\sqrt{5+2\sqrt{5}}}{\pi} \ln\left(\frac{2+\sqrt{5}}{\sqrt{5}}\right) V_{dc} \quad (7)$$

The second voltage threshold (VII) 570 for the second overmodulation region 430 has a magnitude that can be represented in equation (8) as a function of the DC link voltage (Vdc) as follows:

$$V_{II} = \frac{2}{\pi} V_{dc} \quad (8)$$

In a five-phase system, three important modulation regions 410, 420, 430 can be defined in terms of their modulation index. The regions are defined as the linear modulation region 410, the first overmodulation region 420, and the second overmodulation region 430. In the linear modulation region 410 the modulation index ranges between zero and 0.9669 as described in expression (9) as follows:

$$MI \in \left[0, \frac{\pi\sqrt{5+2\sqrt{5}}}{10}\right] = [0, 0.9669] \quad (9)$$

In the first overmodulation region 420 the modulation index ranges between 0.9669 and 0.98322 as described in expression (10) as follows:

$$MI \in \frac{\pi\sqrt{5+2\sqrt{5}}}{10}\left[1, \frac{10}{\pi^2}\ln\left(\frac{2+\sqrt{5}}{\sqrt{5}}\right)\right] = [0.9669, 0.9832] \quad (10)$$

In the second overmodulation region 430 the modulation index ranges between 0.98322 and 1.0000 as described in expression (11) as follows:

$$MI \in [0.9832, 1] \quad (11).$$

Overmodulation of a Five-Phase Machine

Having identified the three important modulation regions 410, 420, 430, methods, systems and apparatus for overmodulation will now be described.

Output voltage generated by the inverter module 110 can be increased via overmodulation using techniques such as those described, for example, in U.S. patent application Ser. No. 12/722,166, filed Mar. 11, 2010, entitled "METHODS, SYSTEMS AND APPARATUS FOR OVERMODULATION OF A FIVE-PHASE MACHINE," and assigned to the assignee of the present invention, which is incorporated herein by reference in its entirety.

In brief, overmodulation is used to optimize voltage commands 182, 184 that control the five-phase PWM controlled inverter module 110 to increase inverter output voltage that is provided to the five-phase machine 120. By increasing the inverter output voltage through overmodulation, the maximum available mechanical torque generated by the five-phase machine 120 can be improved/increased, which in turn can improve/increase machine efficiency and improve dynamic performance of five-phase machine. Moreover, this can also increase the modulation index (MI), which allows for the utilization of the battery voltage (Vdc) to be improved.

Embodiments will now be described that can provide a mechanism for adjusting a duty cycle of PWM waveforms so that the correct phase voltage is applied in every sector where there are transition angles This can reduce variations/errors in the phase voltage applied to the multi-phase machine so that phase current may be properly regulated thus reducing current/torque oscillation, which can in turn improve machine efficiency and performance, as well as utilization of the DC voltage source.

Figure 6:
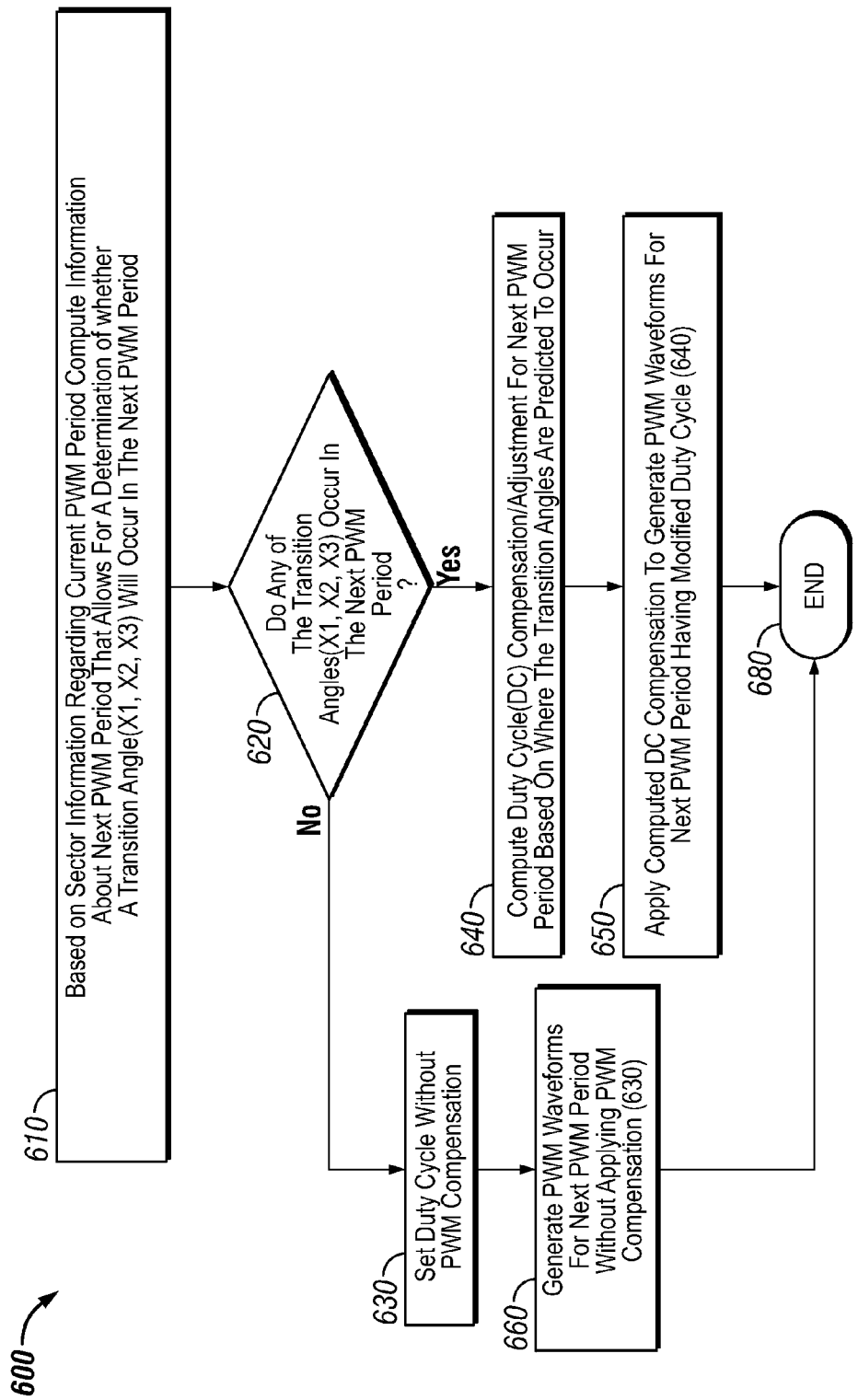
FIG. 6 is a flowchart that illustrates a method in accordance with some of the disclosed embodiments.

FIG. 6 is a flowchart that illustrates a method 600 in accordance with some of the disclosed embodiments.

At step 610, the SVPWM module 108 determines sector boundary information for a current sector, and computes an angular span 785 of a current PWM period 786, a predicted angular span (DeltaPos) 795 of a next PWM period 794, and a plurality of transition angles 790, 792, 793.

The sector boundary information comprises a sector boundary starting angle 782 of the current sector, and a sector boundary ending angle 784 of the current sector. Sectors are located at predefined positions (e.g., 0°, 36°, 72°, 108°, 144°, etc), and the sector boundaries 782, 784 for the current sector can be determined by reading synchronous position (that changes as machine spins) from a resolver (position sensor*factor) at the current PWM boundary angle (CurAng) 788 every PWM period.

The duration of a PWM period is determined by a switching frequency of the PWM generator. This switching frequency is fixed, and therefore the PWM period is fixed (because the PWM generator runs at a fixed frequency). The speed of machine varies depending on how it is operated (i.e., the speed of the machine is not controlled at a fixed speed), and because the speed of the machine is not fixed it is not synchronized with the PWM period. However, a particular instantaneous speed can be read from a speed sensor or position sensor, and because the switching frequency is fixed, the number of electrical degrees in one PWM period can be determined based on the particular instantaneous speed and the switching frequency. Thus, because a particular instantaneous speed can be read from a speed sensor or position sensor, and because the switching frequency is fixed, the angular span (or number of electrical degrees) in one PWM period can be determined based on the particular instantaneous speed and the switching frequency.

Accordingly, the angular span (DeltaPos) 785 of the current PWM period 786 can be computed, based on a switching frequency of a PWM generator and a particular instantaneous speed of the multi-phase electric machine (in rpm) per equation (12) as follows:

$$\text{DeltaPos} = (\text{Speed}/60 * \text{PolePairs}) * (1/\text{SwitchingFrequency}) * 360\text{deg} \qquad (12)$$

As illustrated in FIG. 7C, the angular span 785 of the current PWM period 786 is defined by an old PWM boundary angle (OldAng) 787 that represents the start of the current PWM period 786, and a current PWM boundary angle (CurAng) 788 that represents the end of the current PWM period 786 (as well as the start of a next PWM period 794). The old PWM boundary angle (OldAng) 787 is the difference between the current PWM boundary angle (CurAng) 788 and the angular span (DeltaPos) 785 of the current PWM period 786.

During the current PWM period 786 or before the next PWM period 794 occurs, the SVPWM module 108 can use knowledge of the duration of the current PWM period 786 to predict or forecast a predicted angular span (DeltaPos) 795 for the next PWM period 794. The predicted angular span (DeltaPos) 795 is the angular distance that will be covered by the next PWM period. Any change in speed from one PWM period to the next is negligible or so small it does not significantly affect the predicted results that are computed. Because the speed will not change significantly within a PWM period, the predicted angular span (DeltaPos) 795 can be presumed to be identical to the angular span 785 of the current PWM period 786. The predicted angular span (DeltaPos) 795 allows a next PWM boundary angle (NxtAng) 798 of the next forecasted PWM period 794 to be predicted or forecasted during the current PWM period 786. The next PWM boundary angle (NxtAng) 798 can be computed as the sum of the current PWM boundary angle (CurAng) 788 and the angular span 785 of the current PWM period 786. As illustrated in FIG. 7C, the predicted angular span (DeltaPos) 795 is defined between the current PWM boundary angle (CurAng) 788 that represents the start of a next PWM period 794, and the next PWM boundary angle (NxtAng) 798 that represents the end of the next PWM period 794.

The transition angles are computed based on the sector boundary information and a hold angle ($\alpha_h$) 799 that is provided from an overmodulation processor. The transition angles include a first transition angle (X1) 790, a second transition angle (X2) 792, and a third transition angle (X3) 793. FIG. 8 is a timing diagram that shows duty cycle PWM waveforms calculated and processed at the SVPWM module 108 of FIG. 2A for each phase (A, B, C, D, E) over one electrical cycle based on phase voltage commands signals (Vas* ... Ves*) 107 of FIG. 2A. Each transition angle corresponds to a corner where the direction of any line changes in FIG. 8. Only when hold angle ($\alpha_h$) 799 is 18 degrees in FIG. 7C will the diagonal lines in FIG. 8 become vertical lines. FIG. 8 will be described in more detail below.

Figure 7A:
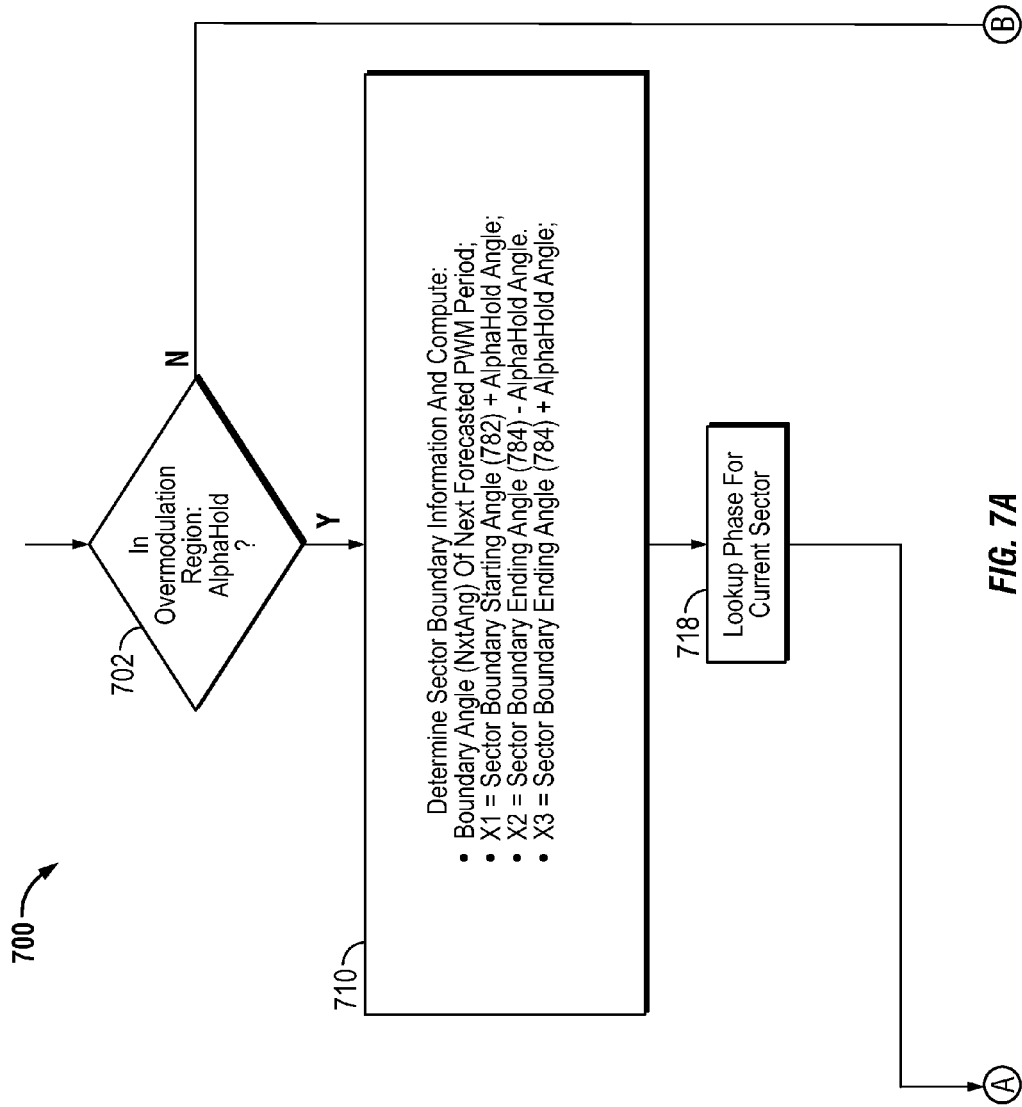
FIGS. 7A, B, D, F, H and J are a flowchart that illustrates one implementation of a method of FIG. 6 in accordance with some of the disclosed embodiments as it is applied in a particular sector.
Figure 8:
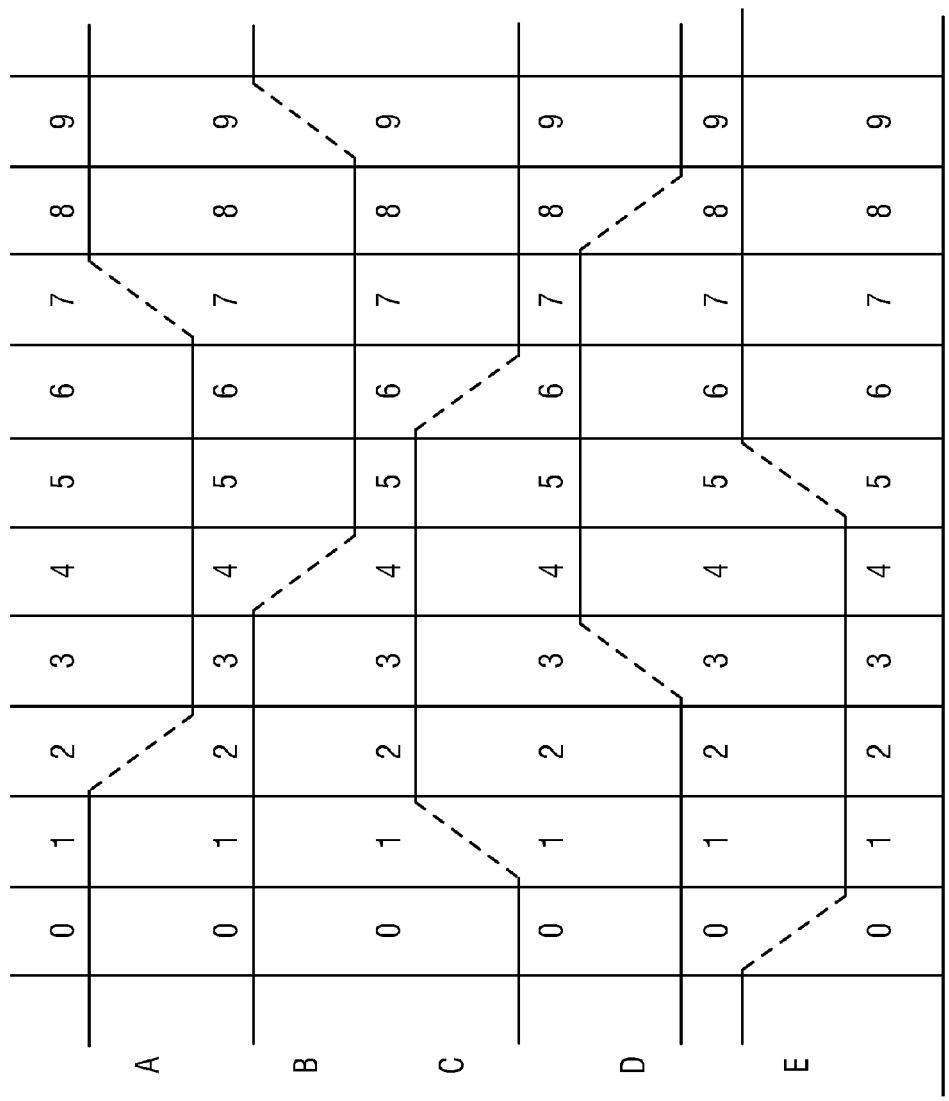
FIG. 8 is a timing diagram that shows duty cycle PWM waveforms calculated and processed at the SVPWM module of FIG. 2A for each phase (A, B, C, D, E) over one electrical cycle based on phase voltage commands signals (Vas* . . . Ves*) of FIG. 2A.

As will be described below, block 710 and 718 of FIG. 7A illustrates steps that can be performed in one exemplary implementation of step 610 of FIG. 6.

By forecasting whether one or more of the transition angles (X1, X2, X3) will occur in the next PWM period (before it occurs), the duty cycle during the next PWM period can be adjusted so that compensation can be applied to help ensure that the correct phase voltage will be applied as expected during the next PWM period.

At step 620, the SVPWM module 108 determines whether any of the transition angles (X1, X2, X3) will occur within the predicted angular span (DeltaPos) 795 of the next PWM period 794. As will be described below, block 720 of FIG. 7A illustrates steps 719, 721, 730, 738, 746, 754 that can be performed in one exemplary implementation of step 620 of FIG. 6.

When the SVPWM module 108 determines (at 620) that a transition angle (X1, X2, X3) will not occur during the next, forecasted PWM period, the method 600 proceeds to step 630, where the SVPWM module 108 sets the duty cycle for the next, forecasted PWM period without applying any PWM compensation. In one embodiment, the SVPWM module 108 sets the duty cycle for the next forecasted PWM period at without any modification. In one implementation of step 630, the SVPWM module 108 sets the duty cycle at either a duty cycle of X % (e.g., 0%) or a duty cycle of Y % (e.g., 100%).

Following step 630, the method 600 then proceeds to step 660, where the SVPWM module 108 generates pulse width modulated (PWM) waveforms for the next PWM period. Here, the duty cycle of the pulse width modulated waveforms for the next PWM period will be the set duty cycle (without compensation) from step 630. The method 600 then ends at step 680.

By contrast, when the SVPWM module 108 determines (at 620) that a transition angle (X1, X2, X3) will occur during the next, forecasted PWM period, the method 600 proceeds to step 640, where the SVPWM module 108 computes a duty cycle adjustment or compensation for the next PWM period. This way the duty cycle for the PWM waveforms of the switching vector signals (Sa ... Se) 109 that will be generated during the next PWM period can be modified. Modification of the duty cycle helps ensure that the correct phase voltage (or "stationary reference frame voltage command") signals (Vas* ... Ves*) 107 are applied at the transition angles X1, X2, X3, which reduces variations in the phase voltage applied to the electric machine, improves regulation of phase current, and thus reduces current/torque oscillation. For example, in one non-limiting example, when a transition angle (X1) is forecasted to occur in the middle of the next PWM period, then a 50% duty cycle can be applied at the end boundary angle of the current PWM period rather that a 100% duty cycle was previously calculated. By adjusting the duty cycle to an appropriate value, the appropriate phase voltage can be generated, and current regulator robustness will improve thus helping reduce and/or eliminate current/torque oscillation. By contrast, if the duty cycle is not modified when there is a transition angle (X1, X2, X3), the wrong phase voltage will be applied in the next PWM period 794, because the duty cycle calculated at the current PWM boundary angle (CurAng) 788 will be applied for the entire next PWM period 794. When the transition angle(s) is/are forecasted, the duty cycle can be adjusted accordingly. This avoids wrong phase voltage applied to the machine, and therefore reduces current oscillation/spikes and torque ripple.

The duty cycle adjustment or compensation for the next PWM period can vary depending on where the transition angle is expected to occur. One exemplary implementation of steps that can be performed to implement step 640 of FIG. 6 are illustrated in block 722 (steps 724, 726, 728) of FIG. 7B, block 731 (steps 733, 734, 736) of FIG. 7D, block 739 (steps 741, 742, 744) of FIG. 7F, block 747 (steps 749, 750, 752) of FIG. 7H, and block 755 (steps 757, 758, 760, 762, 764, 766) of FIG. 7J. As will be described, the duty cycle compensation that is computed for the next PWM period can be at least one of: (1) "trailing-edge 100% compensation" (e.g., step 726 of FIG. 7B, step 734 of FIG. 7D, and step 766 of FIG. 7J); (2) "leading-edge 100% compensation" (e.g., step 728 of FIG. 7B, step 744 of FIG. 7F, and step 764 of FIG. 7J); (3) "trailing-edge 0% compensation" (e.g., step 736 of FIG. 7D, and step 762 of FIG. 7J); (4) "leading-edge 0% compensation" (e.g., step 742 of FIG. 7F, and step 760 of FIG. 7J); (5) "falling-edge slope-derived compensation" (e.g., step 750 of FIG. 7H); or (6) "rising-edge slope-derived compensation" (e.g., step 752 of FIG. 7H)." These different types of duty cycle compensation will be described in greater detail below.

Following step 640, the method 600 proceeds to step 650. At 650, the SVPWM module 108 applies the computed duty cycle adjustment or compensation when generating pulse width modulated waveforms for the next PWM period. The duty cycle of the pulse width modulated waveforms that are generated for the next PWM period will be modified per the duty cycle adjustment or compensation that was computed at step 640. One exemplary implementation of steps that can be performed to implement step 650 of FIG. 6 are illustrated in block 723 (steps 727, 729) of FIG. 7B, block 732 (steps 735, 737) of FIG. 7D, block 740 (steps 743, 745) of FIG. 7D, block 748 (steps 751, 753) of FIG. 7H, and block 756 (steps 761, 763, 765, 767) of FIG. 7J. The method 600 then ends at step 680. In accordance with the proposed method 600, by forecasting the sector transition at step 610 the proper duty cycle (for the stationary reference frame voltage command or "phase voltage" signals (Vas* . . . Ves*) 107) can be calculated and used to modify the duty cycle of the PWM waveforms of the switching vector signals (Sa . . . Se) 109. Modification of the duty cycle by applying the computed duty cycle compensation to the PWM waveforms provides more accurate stationary reference frame voltage command signals (Vas* . . . Ves*) 107 to the electric machine. Consequently current regulation is improved.

FIGS. 7A, B, D, F, H and J are a flowchart that illustrates one implementation of a method 600 in accordance with some of the disclosed embodiments as it is applied in a particular sector. FIGS. 7A, B, D, F, H and J will be explained with reference to FIGS. 7C, E, G, I, K.

Sector Definition, Sector Boundaries, Transition Angles, Current PWM Period and Forecasted PWM Period FIGS. 7C, E, G, I, K each illustrate a particular sector that is defined by a sector boundary ending angle 784 and a sector boundary starting angle 782. A sector refers to an angular span (e.g., 36 degrees in a 5-phase system) between two adjacent voltage switching vectors that are used to generate PWM waveforms 109 of the switching vector signals (Sa . . . Se) 109 that drive switches in a five-phase inverter module. The angular span of the sector is defined by two sector boundaries that are referred to herein as the sector boundary starting angle 782 and the sector boundary ending angle 784. It is noted that in FIGS. 7C, E, G, I, K the angular value along the sector increases in a clockwise direction (i.e., 0 degrees at the +X-axis, 90 degrees at the −Y-axis, 180 degrees at the −X-axis, and 270 degrees at the +Y-axis). The angular span of the sector will vary depending on how many phases the electric machine has. For example, in a five-phase machine implementation, the angular span of the sector is 36 degrees, whereas in a three-phase machine implementation, the angular span of the sector is 60 degrees.

In FIGS. 7C, E, G, I, K the relative angular positions of a current PWM period 786 and a next forecasted PWM period 794 are illustrated with respect to the sector boundary ending angle 784 and the sector boundary starting angle 782.

The current PWM period 786 is defined between an old angle 787 that represents the start of a current PWM period 786 and a current angle 788 represents the end of the current PWM period 786. Stated differently, the old angle 787 and the current PWM boundary angle (CurAng) 788 define an angular span of the current PWM period 786.

A particular instantaneous speed can be read from a speed sensor or position sensor, and because the switching frequency is fixed, the number of electrical degrees in one PWM period can be determined based on the particular instantaneous speed and the switching frequency.

This allows a next PWM boundary angle (NxtAng) 798 of the next forecasted PWM period 794 to be predicted or forecasted during the current PWM period 786.

As illustrated in FIG. 7C, for example, the next, forecasted PWM period 794 starts at the current angle 788 and will end at a next PWM boundary angle (NxtAng) 798. In other words, the current PWM boundary angle (CurAng) 788 and the next PWM boundary angle (NxtAng) 798 define an angular span of the next, forecasted PWM period 794.

Angular Values Computed Based on Hold Angle ($\alpha_h$)

In FIGS. 7C, E, G, I, K, a first transition angle (X1) 790, a second transition angle (X2) 792 and/or a third transition angle (X3) 793 are also illustrated. The first transition angle (X1) 790 and the second transition angle (X2) 792, can be anywhere between the sector boundaries (i.e., between sector boundary ending angle 784 and the sector boundary starting angle 782), whereas the third transition angle (X3) 793 will always be outside the current sector.

The first transition angle (X1) 790 represents the sum of the computed sector boundary starting angle 782 and a hold angle ($\alpha_h$) 799. The hold angle ($\alpha_h$) 799 is a variable command that is a function of the modulation index, and is generated by an overmodulation processor 180, as described, for example, in U.S. patent application Ser. No. 12/722,166, entitled "METHODS, SYSTEMS AND APPARATUS FOR OVERMODULATION OF A FIVE-PHASE MACHINE."

The second transition angle (X2) 792 represents the difference between the computed sector boundary ending angle 784 and the hold angle ($\alpha_h$) 799.

The third transition angle (X3) 793 represents the sum of the computed sector boundary ending angle 784 and the hold angle ($\alpha_h$) 799.

The value of the hold angle ($\alpha_h$) 799 varies based on the modulation index (MI) and can range between a minimum value of 0 degrees and a maximum number of degrees that is equal to one-half the angular span of the sector. The hold angle ($\alpha_h$) 799 is equal to the difference between the first transition angle (X1) 790 and the sector boundary starting angle 782. The hold angle ($\alpha_h$) 799 is also equal to the difference between the sector boundary ending angle 784 and the second transition angle (X2) 792. Thus, in FIGS. 7C, E, G, I, K, the following relationships apply: (1) the difference between the sector boundary ending angle 784 and the second transition angle (X2) 792, is equal to the difference between the first transition angle (X1) 790 and the sector boundary starting angle 782, and (2) the sum of the first transition angle (X1) 790 and the second transition angle (X2) 792 is equal to the sum of the sector boundary ending angle 784 and the sector boundary starting angle 782.

Overview

As will now be described below, a SVPWM module 108 can use knowledge of the duration of the current PWM period time and the synchronous frequency to compute a PWM period angle (DeltaPos) 795 for the next PWM period (i.e., the anglular distance that will be covered by the next PWM period), can compute the first transition angle (X1) 790, the second transition angle (X2) 792 and the third transition angle (X3) 793, and then determine whether any of the transition angles (X1, X2, X3) will occur in a next, forecasted PWM period before the next, forecasted PWM period 794 occurs. When the SVPWM module 108 determines that one of the transition angles (X1, X2, X3) will occur in the next, forecasted PWM period 794, the SVPWM module 108 can compute duty cycle compensation, and then apply the computed duty cycle compensation before the next PWM period 794 occurs to adjust the duty cycle the next PWM period 794 to an appropriate value. If duty cycle is not adjusted when one of the transition angles (X1, X2, X3) will occur in the next PWM period 794, the wrong phase voltage signals (Vas* ... Ves*) 107 will be applied because the duty cycle will not take into account that the change in voltage at the transition angle.

Referring again to FIG. 7A, at step 702, the SVPWM module 108 determines whether the machine is operating in an overmodulation region. When the processor determines that the machine is not operating in the overmodulation region the method 700 ends at step 770.

When the SVPWM module 108 determines that the machine is operating in the overmodulation region, the method 700 proceeds to step 710. Steps 710 and 718 illustrate steps that can be performed by the SVPWM module 108 in one exemplary implementation of step 610 of FIG. 6. In one implementation, at step 710, the SVPWM module 108 determines or computes information including: the sector boundary starting angle 782 of the current sector, the sector boundary ending angle 784 of the current sector, the old PWM boundary angle (OldAng) 787 that represents the start of the current PWM period, the current PWM boundary angle (CurAng) 788 that represents the end of the current PWM period and start of the next PWM period, the angular span (DeltaPos) 795 of the next PWM period 794, the next PWM boundary angle (NxtAng) 798 that represents the end of the next PWM period 794, the hold angle ($\alpha_h$) 799, a first transition angle (X1) 790, the second transition angle (X2) 792, and the third transition angle (X3) 793.

At step 718, the SVPWM module 108 determines (e.g., looks up) which phase of the next PWM period 794 the duty cycle is being determined for so that it knows which phase of the PWM waveform of the switching vector signals (Sa ... Se) 109 will be modified. As illustrated in FIG. 8, every sector (0 ... 9) has transition angles for specific phases. Once the sector number (0 ... 9) is identified, the phase where the duty cycle needs to be modified can be identified.

Figure 7B:
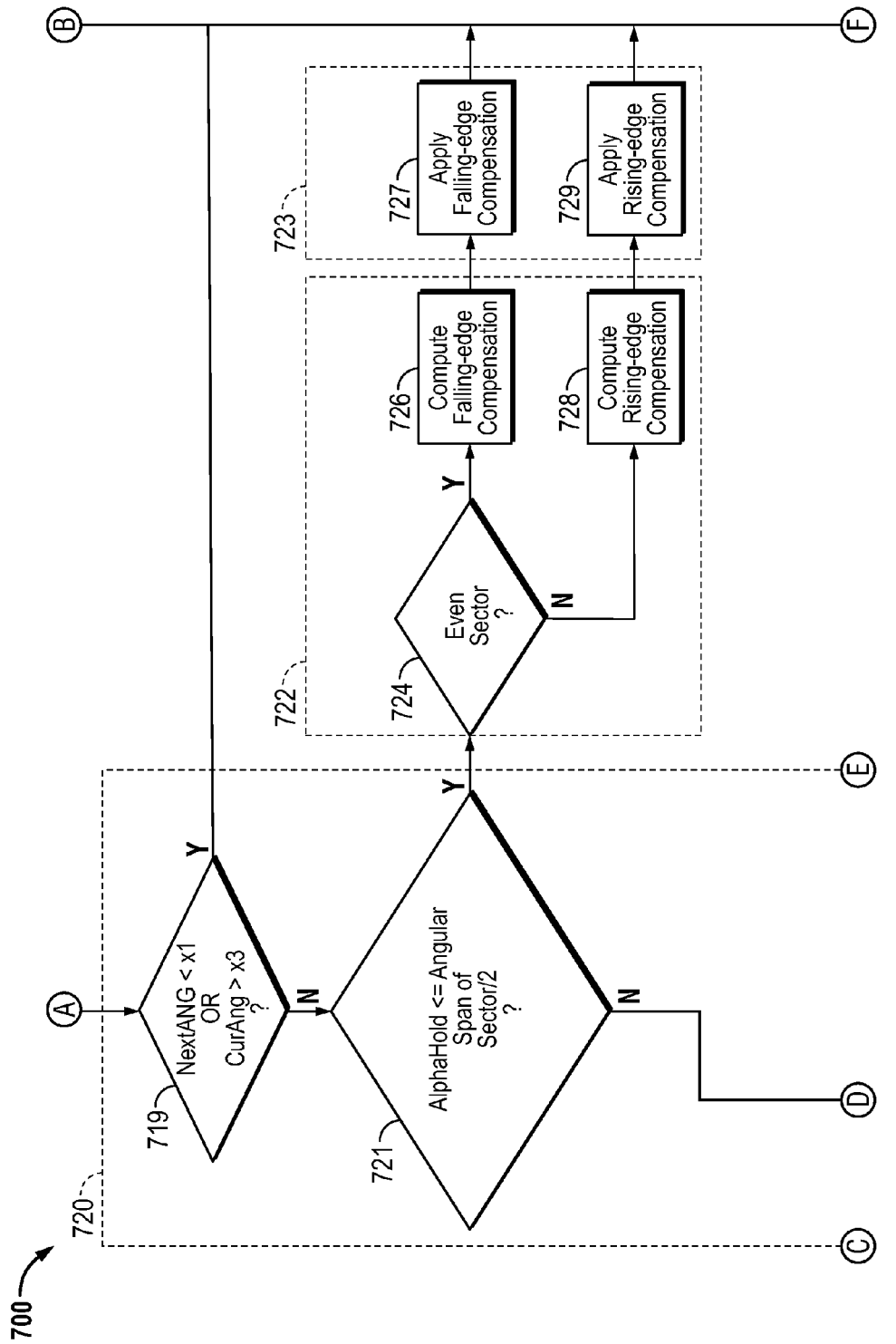
FIGS. 7C, E, G, I, K each illustrate a particular sector along with relative angular positions of a current PWM period and a next forecasted PWM period with respect to various transition angles.

At 719 of FIG. 7B, the SVPWM module 108 determines whether the next PWM boundary angle (NxtAng) 798 is less than the first transition angle (X1) 790 or whether the current PWM boundary angle (CurAng) 788 is greater than the third transition angle (X3) 793 to preliminarily determine whether a transition angle will occur the next forecasted PWM period. If either of these conditions is met (i.e., if either the next PWM boundary angle (NxtAng) 798 is less than the first transition angle (X1) 790, or the current PWM boundary angle (CurAng) 788 is greater than the third transition angle (X3) 793), then the method 700 proceeds to step 770 where the method 700 ends.

By contrast, when both (1) the next PWM boundary angle (NxtAng) 798 is not less than the first transition angle (X1) 790 and (2) the current PWM boundary angle (CurAng) 788 is not greater than the third transition angle (X3) 793, the method 700 proceeds to step 721.

As will be described below with reference to FIGS. 7B, 7D, 7F, 7H and 7J, the SVPWM module 108 may compute and apply different types of duty cycle compensation to the PWM waveform of the switching vector signals (Sa ... Se) 109 (when adjustment of the duty cycle is determined to be necessary). One exemplary implementation of steps that can be performed to implement step 640 of FIG. 6 are illustrated in block 722 (steps 724, 726, 728) of FIG. 7B, block 731 (steps 733, 734, 736) of FIG. 7D, block 739 (steps 741, 742, 744) of FIG. 7F, block 747 (steps 749, 750, 752) of FIG. 7H, and block 755 (steps 757, 758, 760, 762, 764, 766) of FIG. 7J.

As will be described below, the computed duty cycle (DC) adjustment or compensation that is computed for the next PWM period can be one of six different types. With respect to FIG. 8 it is noted that depending on the type of duty cycle compensation applied, the duty cycles of either one or two of the phase voltage signals 107 (in one or two phases) is modified when compensation is applied. In other words, all the duty cycles of all five phases are not modified when compensation is applied.

When the hold angle ($\alpha_h$) 799 is "small" meaning that the hold angle 799 is close to 0 degrees, and a single transition angle (the first transition angle (X1) 790 or the second transition angle (X2) 792) is projected to occur in the next PWM cycle, then one of four types of compensation that can be applied to adjust the duty cycle of the PWM waveform: (1) leading-edge 100% compensation, (2) trailing-edge 100% compensation, (3) leading-edge 0% compensation, or (4) trailing-edge 0% compensation.

Leading-edge 100% compensation produces a duty cycle less than 100%. Examples of leading-edge 100% compensation include: the leading-edge 100% compensation (step 728 of FIG. 7B), the leading-edge 100% compensation (step 744 of FIG. 7F), and the leading-edge 100% compensation (step 764 of FIG. 7J).

Trailing-edge 100% compensation produces a duty cycle less than 100%, but as will be described below, is calculated differently than leading-edge 100% compensation. Examples of trailing-edge 100% compensation include: the trailing-edge 100% compensation (step 726 of FIG. 7B), the trailing-edge 100% compensation (step 734 of FIG. 7D), and the trailing-edge 100% compensation (step 766 of FIG. 7J).

Leading-edge 0% compensation produces a duty cycle greater than 0%. Examples of leading-edge 0% compensation include: the leading-edge 0% compensation (step 742 of FIG. 7F), and the leading-edge 0% compensation (step 760 of FIG. 7J).

Trailing-edge 0% compensation produces duty cycle greater than 0%, but as will be described below, is calculated differently than leading-edge 0% compensation. Examples of trailing-edge 0% compensation include: the trailing-edge 0% compensation (step 736 of FIG. 7D) and the trailing-edge 0% compensation (step 762 of FIG. 7J).

When the hold angle ($\alpha_h$) 799 is "large" meaning that the hold angle ($\alpha_h$) 799 is close to 18 degrees for five-phase machine (or that the hold angle ($\alpha_h$) 799 is close to 30 degrees for a three-phase machine), and two transition angles (both the first transition angle (X1) 790 and the second transition angle (X2) 792) are projected to occur in the next PWM cycle, then the different types of compensation that can be applied to adjust the duty cycle of the PWM waveform can be either: (5) a falling-edge slope-derived compensation in which a combination of trailing-edge 100% compensation and leading-edge 0% compensation is used to generate a single PWM cycle having a duty cycle >0% and <100%, or (6) a rising-edge slope-derived compensation in which a combination of leading-edge 100% compensation and trailing-edge 0% compensation is used to generate a single PWM cycle having a duty cycle >0% and <100%. An example of falling-edge slope-derived compensation is the falling-edge slope-derived compensation (step 750 of FIG. 7H), whereas an example of rising-edge slope-derived compensation is the rising-edge slope-derived compensation (step 752 of FIG. 7H). The last two compensations are applied when both first transition angle (X1) 790 and second transition angle (X2) 792 occur in the same PWM cycle. The falling-edge slope-derived compensation is used when transitioning from 100% to 0%, and the rising-edge slope-derived compensation is used when transitioning from 0% to 100%. It is also noted that in one special case, when the hold angle ($\alpha_h$) 799 reaches its maximum value, the first transition angle (X1) 790 and second transition angle (X2) 792 come together, and when this happens, one of the trailing-edge compensations is applied.

When the method 700 proceeds to step 721 following step 719, the SVPWM module 108 determines whether the hold angle ($\alpha_h$) 799 is greater than or equal to one-half of the angular span of a sector (e.g., 18 degrees in a five-phase implementation, or 30 degrees in a three-phase implementation). FIG. 7C is sector diagram that illustrates a scenario where the hold angle ($\alpha_h$) 799 is equal to one-half of the angular span the sector, and the first transition angle (X1) 790 and the second transition angle (X2) 792 fall within or occur in the next, forecasted PWM period 794 and are aligned at the midpoint of the sector (i.e., at 18 degrees from sector boundary 782).

Referring again to FIG. 8 a timing diagram shows duty cycle PWM waveforms calculated and processed at the SVPWM module 108 of FIG. 2A for each phase (A, B, C, D, E) over one electrical cycle based on phase voltage commands signals (Vas* . . . Ves*) 107 of FIG. 2A. The relationship between Duty Cycle PWM and phase voltage commands signals 107 can be determined by: Duty Cycle PWM=Phase Voltage*A+B, where A is a scaling factor and B is and offset.

In FIG. 8, ten sectors are labeled from 0 to 9. The electrical cycle spans 10 sectors (0 . . . 9). FIG. 8 does not show any modifications to the duty cycle, but it shows the transition angles where lines change direction. Over one electrical cycle, each PWM waveform for each phase will undergo four transitions, two between 0 (or 0%) and 1 (or 100%), or vice-versa. For example, phase A is illustrated as transitioning in sectors 2 and 7, phase B is illustrated as transitioning in sectors 4 and 9, phase C is illustrated as transitioning in sectors 1 and 6, phase D is illustrated as transitioning in sectors 3 and 8, and phase E is illustrated as transitioning in sectors 0 and 5.

Further, in each sector (0 . . . 9), one of the five phase A-E will undergo a diagonal transition. The PWM waveform always transitions from 1 (or 100%) to 0 (or 0%) in even sectors, and from 0 (or 0%) to 1 (or 100%) in odd sectors. For instance, in sector 2, phase A transitions from 100% to 0%, whereas in sector 3, phase D transitions from 0% to 100%. In the case depicted in FIG. 8, there would be one or more normal PWM cycles between each consecutive group of 0 and 100% cycles. This means that in FIG. 8 the Duty Cycle at 100% (upper horizontal line of each phase) is made up of several PWM cycles, which all have 100% duty cycle. The Duty Cycle at 0% (lower horizontal line of each phase) is also made of several PWM cycles, which all have 0% duty cycle. Thus, each trace in FIG. 8 is made of several PWM cycles.

The slope of the diagonal lines will change depending on the value of the hold angle ($\alpha_h$) 799. When the hold angle ($\alpha_h$) 799 is at its maximum value, the lines become substantially vertical. When the hold angle ($\alpha_h$) 799 is very small, the lines have minimum slope, transitioning very close to the vertical lines (sector boundaries). The transition points should be equidistant from the vertical lines. The transition points never touch the vertical lines because overmodulation mode only occurs when hold angle ($\alpha_h$) 799>0.

In FIG. 8, the diagonal transitions modulate the time between the 2 voltage switching vectors to achieve the required voltage. For instance, as the diagonal transition at phase E goes between 1 and 0, this corresponds to voltage switching vector V1 (11001), and then voltage switching vector V2 (11000), which is sector 1. Then during the second sector 2, as the diagonal transition at phase C goes between 0 and 1, this corresponds to voltage switching vector V2 (11000), and then to voltage switching vector V2 (11100).

Referring again to FIG. 7B, when the SVPWM module 108 determines that the hold angle ($\alpha_h$) 799 is greater than or equal to one-half of the angular span the sector, the method proceeds to step 724, where the SVPWM module 108 determines if the current sector is an even numbered sector. As shown in FIG. 8, a PWM waveform always transitions from 100% to 0% in even sectors and from 0% to 100% in odd sectors.

When the current sector is an even numbered sector the method proceeds to step 726, where the SVPWM module 108 computes trailing-edge 100% compensation, and then applies trailing-edge 100% compensation at step 727. As used herein, the term "trailing-edge 100% compensation" refers to compensation that the SVPWM module 108 computes at step 726 to adjust the duty cycle of the PWM waveforms of the switching vector signals (Sa . . . Se) 109, and in one implementation can be computed based on equation (13) as follows:

$$CompDuty=(x1-CurAng)/DeltaPos \qquad (13),$$

where x1 is first transition angle (X1) 790, CurAng is the current PWM boundary angle (CurAng) 788, and DeltaPos is the computed angular span 795 of the next PWM period 794.

In one implementation, the SVPWM module 108 then applies trailing-edge 100% compensation at step 727 based on equation (14) as follows:

$$FirstModifiedPWM=FirstPWM*CompDuty \qquad (14),$$

where FirstPWM is the PWM duty cycle for the first transition angle (X1) 790 for a specific phase depending on the sector, and where CompDuty is the computed duty cycle compensation computed via equation (13). It is noted that the original duty cycle is 100%, but in this case the duty cycle will be modified to be less than 100% with equations (13) and (14). The particular phase (A . . . E) that is modified depends on the sector.

By contrast, when the SVPWM module 108 determines that the current sector is not an even-numbered sector (or is an odd-numbered sector), then the method proceeds to step 728 where the SVPWM module 108 computes leading-edge 100% compensation, and then applies leading-edge 100% compensation at step 729 to generate the modified duty cycle for the next PWM period. As used herein, the term "leading-edge 100% compensation" refers to compensation that the SVPWM module 108 computes at step 728 to adjust the duty cycle of the PWM waveforms of the switching vector signals (Sa . . . Se) 109, and in one implementation can be computed based on equation (15) as follows:

$$CompDuty=(NxtAng-x1)/DeltaPos \qquad (15),$$

where x1 is first transition angle (X1) 790, NxtAng is the next PWM boundary angle (NxtAng) 798 that represents the end of the next PWM period 794, and DeltaPos is the computed angular span 795 of the next PWM period 794. In one implementation, the SVPWM module 108 then applies leading-edge 100% compensation at step 729 based on equation (16) as follows:

$$\text{FirstModifiedPWM} = \text{FirstPWM} * \text{CompDuty} \qquad (16),$$

where FirstPWM is the PWM duty cycle for first transition angle (X1) 790 for a specific phase that depends on the sector, and where CompDuty is the computed duty cycle compensation computed via equation (15).

Figure 9:
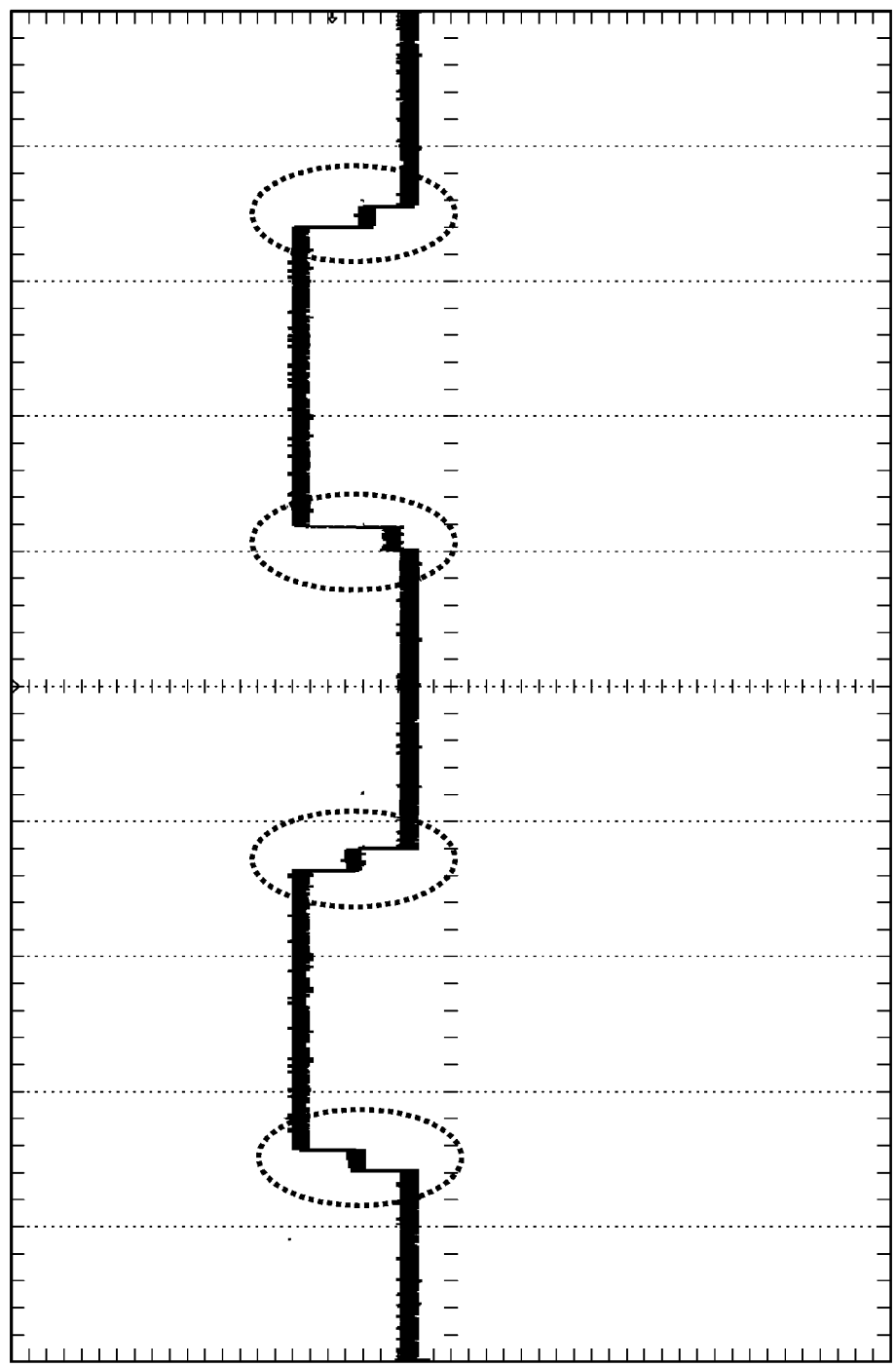
FIG. 9 illustrates an example of switching vector signals (Sa . . . Se) 109 generated at the Space Vector (SV) PWM module 108 in accordance with some of the disclosed embodiments.

FIG. 9 illustrates an example of switching vector signals (Sa ... Se) 109 generated at the Space Vector (SV) PWM module 108 in accordance with some of the disclosed embodiments. FIG. 9 illustrates an example when the duty cycle is modified in FIG. 7B and FIG. 7C, where X1 and X2 are at the same hold angle of 18 degrees. In other words, the condition depicted in FIG. 9 would correspond to a case where the transitions in FIG. 9 have been modified to provide the correct phase voltages 107.

In FIG. 9, the rising and falling edges in each cycle of the switching vector signals (Sa ... Se) 109 belong to different PWM periods, and a cyclical span of 2 electrical cycles is shown for purposes of illustration. The period in FIG. 9 corresponds to the period FIG. 8. It is noted that in this particular exemplary implementation for a five-phase machine in the overmodulation region, one electrical cycle spans 10 sectors (0 ... 9), and every sector has three (3) switching PWM periods. However, it is noted that the number of switching periods per sector can change in other implementations depending on the switching frequency that the inverter module 110 can handle and the synchronous frequency (speed).

FIG. 9 illustrates that by forecasting sector transition, a proper duty cycle for the duty cycle waveforms of the switching vector signals (Sa ... Se) 109 can be calculated and applied so that the correct phase voltage command signals (Vas* ... Ves*) 107 (also referred to as stationary reference frame voltage command signals (Vas* ... Ves*) 107) are applied in each PWM sector. This results in less variations in the stationary reference frame voltage command signals (Vas* ... Ves*) 107, and as a result, a more accurate phase voltage signals 107 are applied to the machine. As a consequence, regulation of phase current is improved thereby resulting in less current/torque oscillation.

Figure 7D:
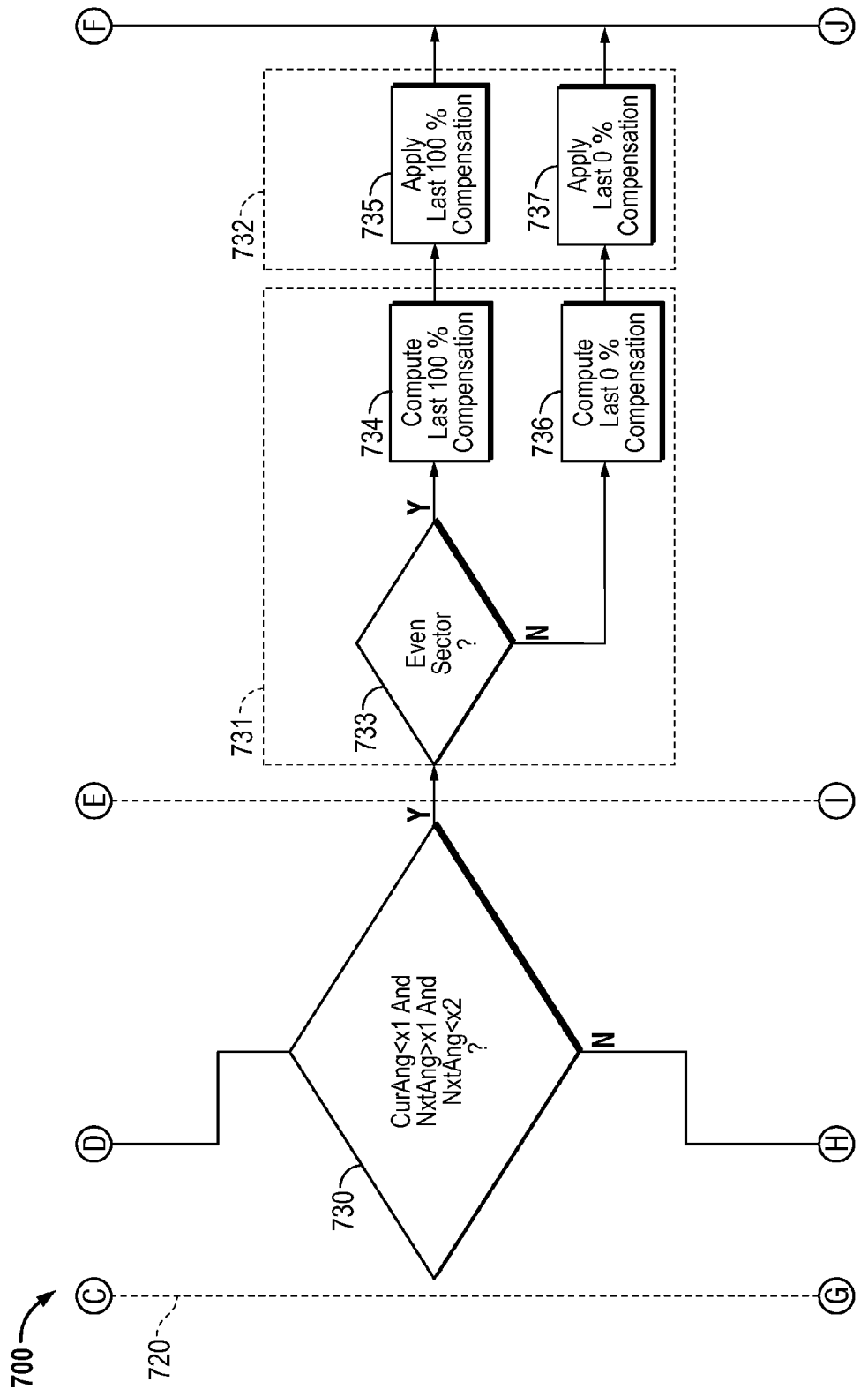

Referring again to FIG. 7B, when the SVPWM module 108 determines that the hold angle ($\alpha_h$) 799 is less than one-half of the angular span of the sector, the method 700 proceeds to step 730 of FIG. 7D.

At step 730, SVPWM module 108 performs three checks to determine how to proceed. More specifically, at step 730, the SVPWM module 108 determines whether the current PWM boundary angle (CurAng) 788 is less than the first transition angle (X1) 790, determines whether the next PWM boundary angle (NxtAng) 798 is greater than the first transition angle (X1) 790, and determines whether the next PWM boundary angle (NxtAng) 798 is less than the second transition angle (X2) 792.

When the SVPWM module 108 determines that the current PWM boundary angle (CurAng) 788 is less than the first transition angle (X1) 790, that the next PWM boundary angle (NxtAng) 798 is greater than the first transition angle (X1) 790, and that the next PWM boundary angle (NxtAng) 798 is less than the second transition angle (X2) 792, then the method 700 proceeds to step 733, where the where the SVPWM module 108 determines if the current sector is an even-numbered sector.

Figure 7E:
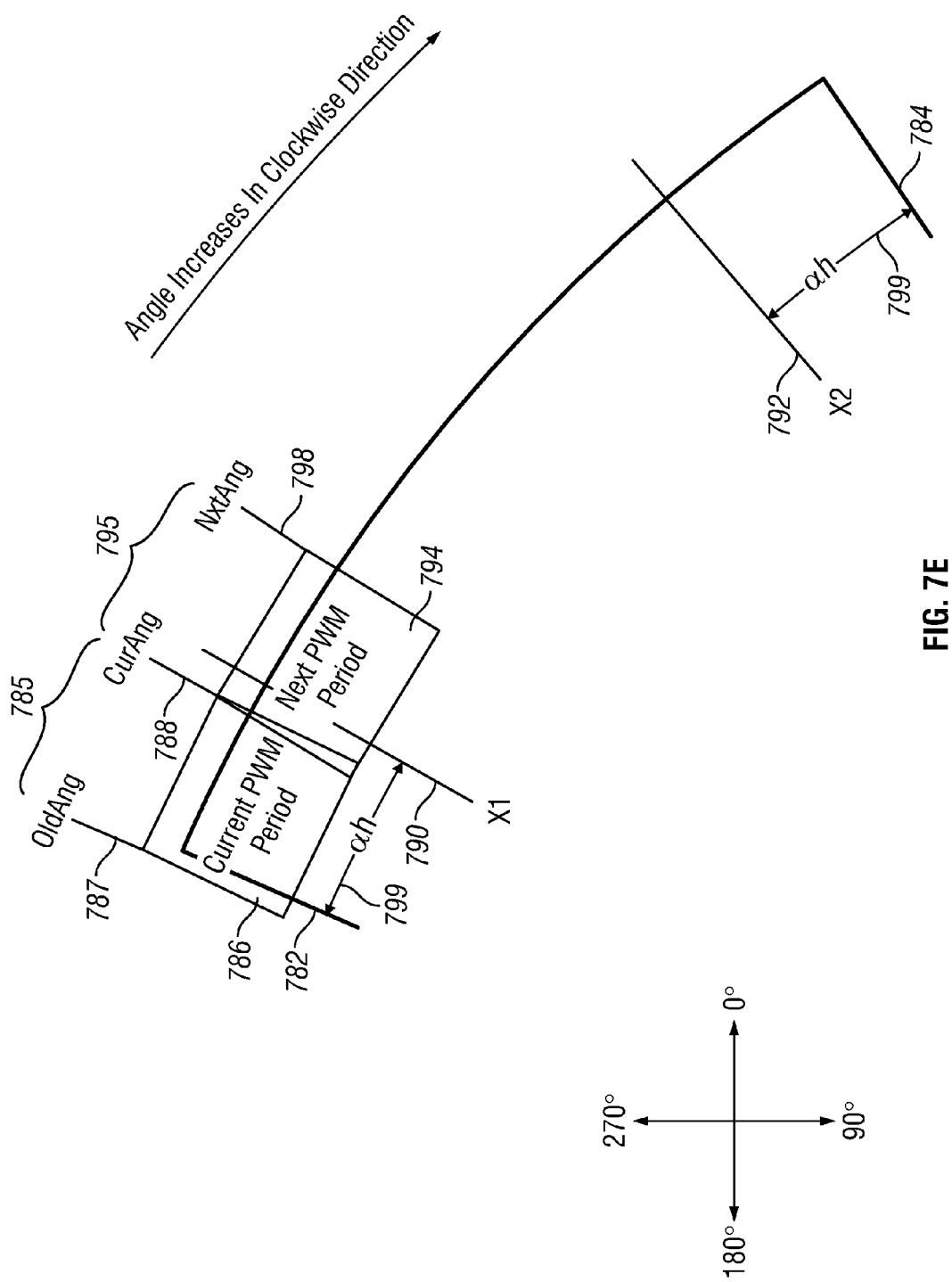

FIG. 7E is sector diagram that illustrates a scenario where the current PWM boundary angle (CurAng) 788 is less than the first transition angle (X1) 790, the next PWM boundary angle (NxtAng) 798 is greater than the first transition angle (X1) 790, the next PWM boundary angle (NxtAng) 798 is less than the second transition angle (X2) 792, and only the first transition angle (X1) 790 falls within or occurs in the next, forecasted PWM period 794. In this scenario, because the first transition angle (X1) 790 falls within or occurs in the next forecasted PWM period 794, the duty cycle during the next PWM period will be modified as described below.

Referring again to FIG. 7D, when the current sector is an even-numbered sector, the method proceeds to step 734, where the SVPWM module 108 computes trailing-edge 100% compensation, and then applies trailing-edge 100% compensation at 735 to generate the modified duty cycle for the next PWM period, and the method 700 then ends at step 770. As used herein, the term "trailing-edge 100% compensation" refers to compensation that the SVPWM module 108 computes at step 734 to adjust the duty cycle of the PWM waveforms of the switching vector signals (Sa ... Se) 109, and in one implementation can be computed based on equation (15) above. In one implementation, the SVPWM module 108 then applies trailing-edge 100% compensation at step 735 based on equation (17) as follows:

$$\text{First ModifiedPWM} = \text{FirstPWM} * (100\% - \text{CompDuty}) \qquad (17),$$

where FirstPWM is the PWM duty cycle for first transition angle (X1) 790 for a specific phase that depends on the sector, and where CompDuty is the computed duty cycle compensation computed via equation (15). The compensation is calculated the same for both rising and falling edges via equation (15), but it is added to 0% in the rising case in equation (16) and subtracted from 100% in the falling case in equation (17). Referring to FIG. 7E, as one example of trailing-edge 100% compensation, when the first transition angle (X1) 790 occurs in the middle of the next forecasted PWM period 794, the duty cycle must be compensated, and the 50% computed for this duty cycle would be adjusted up to decrease the voltage and simulate the less than 100% in this PWM cycle (portion to the right of first transition angle (X1) 790 in the next forecasted PWM period 794). This compensation would be "trailing-edge 100%" because it compensates for a transition from 100% to some lesser value. "It is also noted that the trailing-edge 100% compensation" (at step 726) is the same as the trailing-edge 100% compensation" (at step 734) except the next period duty cycle is always 0% in the former case and can have any value <100% in the latter case.

By contrast, when the SVPWM module 108 determines that the current sector is not an even-numbered sector, then the method proceeds to step 736, where the SVPWM module 108 computes trailing-edge 0% compensation, and then applies trailing-edge 0% compensation at 737 to generate the modified duty cycle for the next PWM period, and the method 700 then ends at step 770. As used herein, the term "trailing-edge 0% compensation" refers to compensation that the SVPWM module 108 computes at step 736 to adjust the duty cycle of the PWM waveforms of the switching vector signals (Sa ... Se) 109, and in one implementation can be computed based on equation (15) above. In one implementation, the SVPWM module 108 then applies trailing-edge 0% compensation at step 737 based on equation (18) as follows:

$$\text{FirstModifiedPWM} = \text{FirstPWM} + (100\% - \text{FirstPWM}) * \text{CompDuty} \qquad (18),$$

where FirstPWM is the PWM duty cycle for the first transition angle (X1) 790 for a specific phase that depends on the sector, and where CompDuty is the computed duty cycle compensation computed via equation (15). Trailing-edge 0% compensation is the reciprocal of trailing-edge 100% compensation. In FIG. 7E an example of trailing-edge 0% compensation would be when transitioning from 0% at first transition angle (X1) 790 to 100% at second transition angle (X2) 792. The compensation applied during the next forecasted PWM period 794 would be "trailing-edge 0%." The 10% duty cycle computed for this PWM period would be adjusted down to delay the transition point from 0%.

Figure 7F:
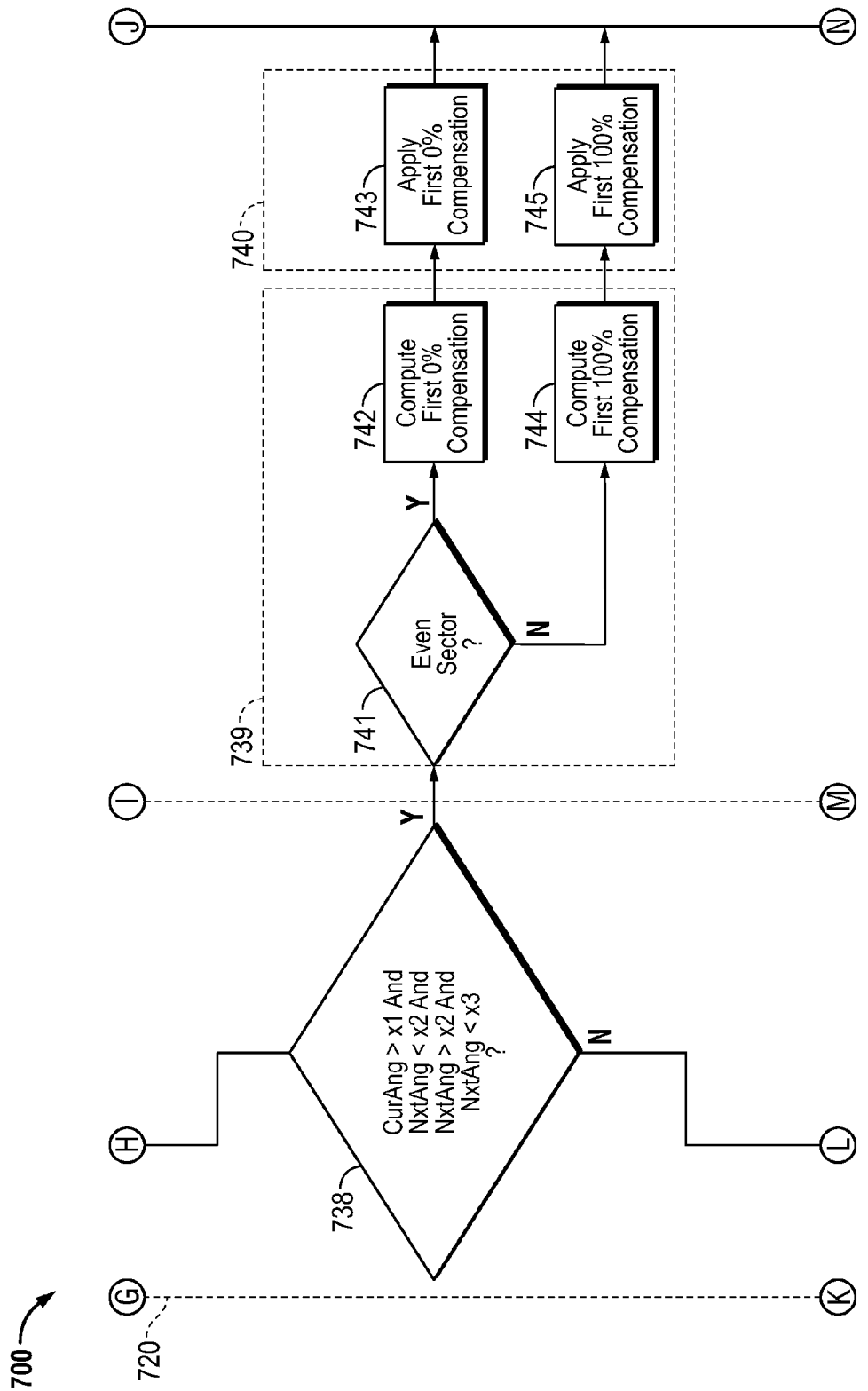

When the SVPWM module 108 determines that the current PWM boundary angle (CurAng) 788 is not less than the first transition angle (X1) 790, or that the next PWM boundary angle (NxtAng) 798 is not greater than the first transition angle (X1) 790, or that the next PWM boundary angle (NxtAng) 798 is not less than the second transition angle (X2) 792, then the method 700 proceeds to step 738 of FIG. 7F.

At step 738, the SVPWM module 108 performs four checks to determine how to proceed. More specifically, at step 738, the SVPWM module 108 determines whether the current PWM boundary angle (CurAng) 788 is greater than the first transition angle (X1) 790, determines whether the current PWM boundary angle (CurAng) 788 is less than the second transition angle (X2) 792, determines whether the next PWM boundary angle (NxtAng) 798 is greater than the second transition angle (X2) 792, and determines whether the next PWM boundary angle (NxtAng) 798 is less than the third transition angle (X3) 793.

When the SVPWM module 108 determines that the current PWM boundary angle (CurAng) 788 is greater than the first transition angle (X1) 790, that the current PWM boundary angle (CurAng) 788 is less than the second transition angle (X2) 792, that the next PWM boundary angle (NxtAng) 798 is greater than the second transition angle (X2) 792, and that the next PWM boundary angle (NxtAng) 798 is less than the third transition angle (X3) 793, then the method 700 proceeds to step 741, where the SVPWM module 108 determines if the current sector is an even-numbered sector.

FIG. 7G is sector diagram that illustrates a scenario where the current PWM boundary angle (CurAng) 788 is greater than the first transition angle (X1) 790, the current PWM boundary angle (CurAng) 788 is less than the second transition angle (X2) 792, the next PWM boundary angle (NxtAng) 798 is greater than the second transition angle (X2) 792, the next PWM boundary angle (NxtAng) 798 is less than the third transition angle (X3) 793, and only the second transition angle (X2) 792 falls within or occurs in the next, forecasted PWM period 794. In this scenario, because the second transition angle (X2) 792 falls within or occurs in the next, forecasted PWM period 794, the duty cycle during the next PWM period will be modified as described below.

Referring again to FIG. 7F, when the current sector is an even-numbered sector, the method proceeds to step 742, where the SVPWM module 108 computes leading-edge 0% compensation, and then applies leading-edge 0% compensation at 743 to generate the modified duty cycle for the next PWM period. The method 700 then ends at step 770. As used herein, the term "leading-edge 0% compensation" refers to compensation that the SVPWM module 108 computes at step 742 to adjust the duty cycle of the PWM waveforms of the switching vector signals (Sa . . . Se) 109, and in one implementation can be computed based on equations (19, 20 and 21) as follows:

$$\text{CompDuty}=(\text{NxtAng}-x2)/\text{DeltaPos} \quad (19)$$

$$\text{DutySlope}=(A*\text{AlphaHold}+B)/(100\%+\text{AlphaHold}* (C+D*\text{AlphaHold})) \quad (20)$$

$$\text{NextDuty}=\text{DutySlope}*(\text{NxtAng}-x2)+100\% \quad (21),$$

where A, B, C and D are constants, and where AlphaHold is the hold angle ($\alpha_h$) 799, where x2 is the second transition angle (X2) 792, NxtAng is the next PWM boundary angle (NxtAng) 798 that represents the end of the next PWM period 794, and DeltaPos is the computed angular span 795 of the next PWM period 794. In one implementation, the SVPWM module 108 then applies leading-edge 0% compensation at step 743 based on equation (22) as follows:

$$\text{FirstModifiedPWM}=\text{NextDuty}*\text{CompDuty} \quad (22),$$

where NextDuty is the result of equation (21), and where CompDuty is the computed duty cycle compensation computed via equation (19). In FIG. 7G, when the PWM value of 100% computed for the next forecasted PWM period 794 needs to be compensated downward because second transition angle (X2) 792 occurs in this next forecasted PWM period 794, the compensation would be "leading-edge 0%" because it compensates for a transition to 0% from some greater value.

By contrast, when the SVPWM module 108 determines that the current sector is not an even-numbered sector, then the method proceeds to step 744, where the SVPWM module 108 computes leading-edge 100% compensation, and then applies leading-edge 100% compensation at 745 to generate the modified duty cycle for the next PWM period. The method 700 then ends at step 770. As used herein, the term "leading-edge 100% compensation" refers to compensation that the SVPWM module 108 computes at step 744 to adjust the duty cycle of the PWM waveforms of the switching vector signals (Sa . . . Se) 109, and in one implementation can be computed based on equations (19, 20, and 23) as follows:

$$\text{CompDuty}=(\text{NxtAng}-x2)/\text{DeltaPos} \quad (19)$$

$$\text{DutySlope}=(A*\text{AlphaHold}+B)/(100\%+\text{AlphaHold}* (C+D*\text{AlphaHold})) \quad (20)$$

$$\text{NextDuty}=-\text{DutySlope}*(\text{NxtAng}-x2)+100\% \quad (23)$$

In one implementation, the SVPWM module 108 then applies leading-edge 100% compensation at step 745 based on equation (24) as follows:

$$\text{FirstModifiedPWM}=(100\%-\text{NextDuty})(100\%-\text{CompDuty})+\text{NextDuty} \quad (24),$$

where NextDuty is the result of equation (23), and where CompDuty is the computed duty cycle compensation computed via equation (19). Leading-edge 100% compensation is the reciprocal of leading-edge 0% compensation. In FIG. 7G, an example of leading-edge 100% compensation would be when the 90% duty cycle computed for the next forecasted PWM period 794 would be compensated upwards to shift the second transition angle (X2) 792 transition left.

Figure 7H:
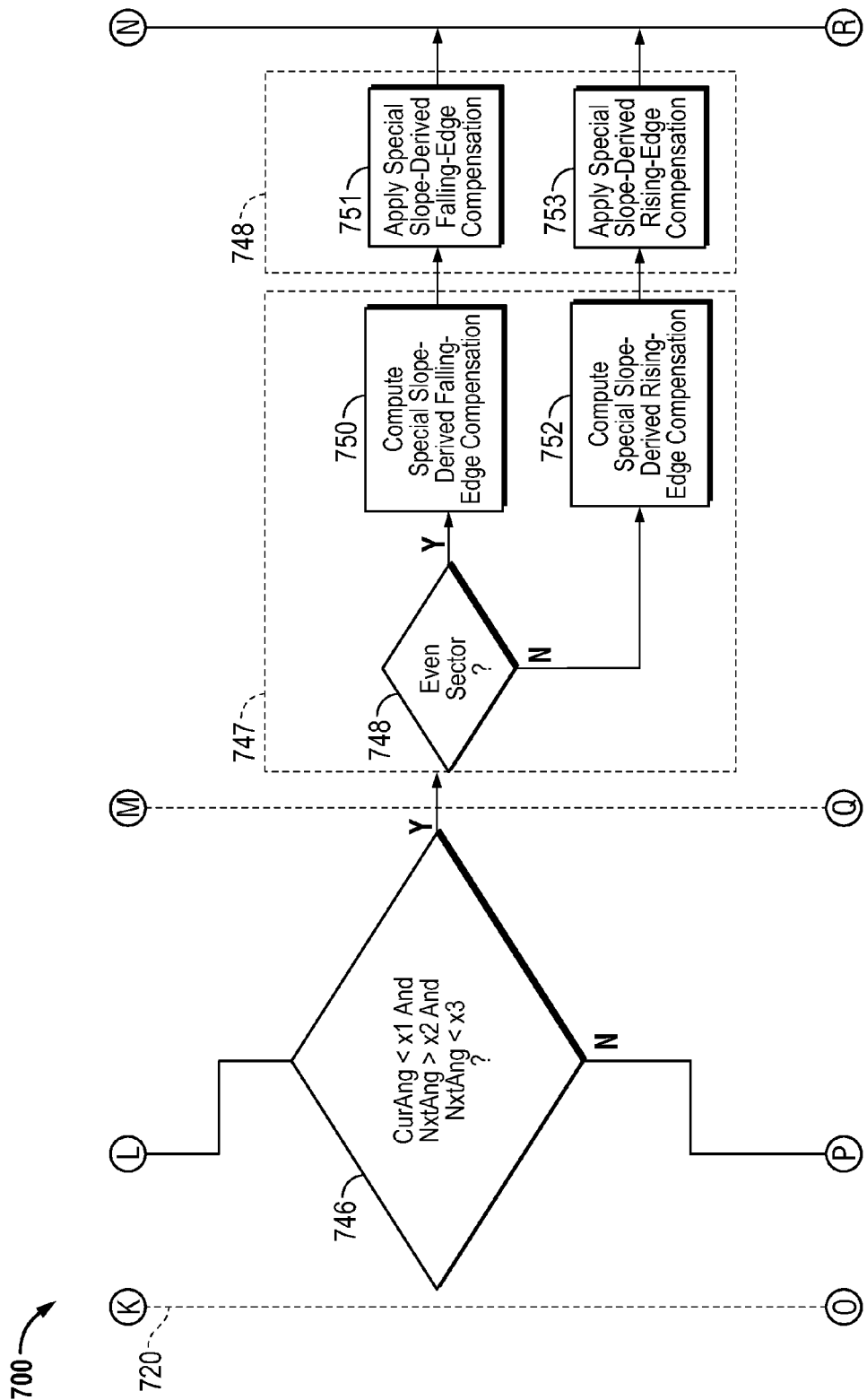

When the SVPWM module 108 determines (at step 738) that the current PWM boundary angle (CurAng) 788 is not greater than the first transition angle (X1) 790, or that the current PWM boundary angle (CurAng) 788 is not less than the second transition angle (X2) 792, or that the next PWM boundary angle (NxtAng) 798 is not greater than the second transition angle (X2) 792, or that the next PWM boundary angle (NxtAng) 798 is greater than the third transition angle (X3) 793, then the method 700 proceeds to step 746 (FIG. 7H).

At step 746, the SVPWM module 108 performs three checks to determine how to proceed. More specifically, at step 746, the SVPWM module 108 determines whether the current PWM boundary angle (CurAng) 788 is less than the first transition angle (X1) 790, determines whether the next PWM boundary angle (NxtAng) 798 is greater than the second transition angle (X2) 792, and determines whether the next PWM boundary angle (NxtAng) 798 is less than the third transition angle (X3) 793.

When the SVPWM module 108 determines that the current PWM boundary angle (CurAng) 788 is less than the first transition angle (X1) 790, that the next PWM boundary angle (NxtAng) 798 is greater than the second transition angle (X2) 792, and that the next PWM boundary angle (NxtAng) 798 is less than the third transition angle (X3) 793, then the method 700 proceeds to step 749, where the where the SVPWM module 108 determines if the current sector is an even-numbered sector.

FIG. 7I is sector diagram that illustrates a scenario where the current PWM boundary angle (CurAng) 788 is less than the first transition angle (X1) 790, the next PWM boundary angle (NxtAng) 798 is greater than the second transition angle (X2) 792, the next PWM boundary angle (NxtAng) 798 is less than the third transition angle (X3) 793, and both the first transition angle (X1) 790 and the second transition angle (X2) 792 fall within or occur in the next, forecasted PWM period 794. In this scenario, because the first transition angle (X1) 790 and the second transition angle (X2) 792 fall within or occur in the next, forecasted PWM period 794, the duty cycle during the next PWM period will be modified as described below.

Referring again to FIG. 7H, when the current sector is an even-numbered sector, the method proceeds to step 750, where the SVPWM module 108 computes a falling-edge slope-derived compensation, and at 751, applies the falling-edge slope-derived compensation to generate the modified duty cycle for the next PWM period. The method 700 then ends at step 770. As used herein, the term "falling-edge slope-derived compensation" refers to compensation that the SVPWM module 108 computes at step 750 to adjust the duty cycle of the PWM waveforms of the switching vector signals (Sa . . . Se) 109, and in one implementation can be computed based on equation (25) as follows:

$$CompDuty1 = AlphaHold/(Sector\ boundary\ starting\ angle - CurAng) \tag{25}$$

In one implementation, the SVPWM module 108 then applies "falling-edge slope-derived compensation" at step 751 based on equation (26) as follows:

$$FirstModifiedPWM = FirstPWM(100\% - CompDuty1) \tag{26}$$

where CompDuty1 is the computed duty cycle compensation computed via equation (25).

By contrast, when the SVPWM module 108 determines that the current sector is not an even-numbered sector (i.e., is an odd-numbered sector), then the method proceeds to step 752, where the SVPWM module 108 computes a rising-edge slope-derived compensation, and then applies the rising-edge slope-derived compensation at 753 to generate the modified duty cycle for the next PWM period. The method 700 then ends at step 770.

As used herein, the term "rising-edge slope-derived compensation" refers to compensation that the SVPWM module 108 computes at step 752 to adjust the duty cycle of the PWM waveforms of the switching vector signals (Sa . . . Se) 109, and in one implementation can be computed based on equation (27) as follows:

$$CompDuty1 = AlphaHold/(Sector\ boundary\ starting\ angle - CurAng) \tag{27}$$

In one implementation, the SVPWM module 108 then applies "rising-edge slope-derived compensation" at step 753 based on equation (28) as follows:

$$FirstModifiedPWM = FirstPWM + (100\% - FirstPWM) * CompDuty1 \tag{28},$$

where CompDuty1 is the computed duty cycle compensation computed via equation (27).

Figure 7J:
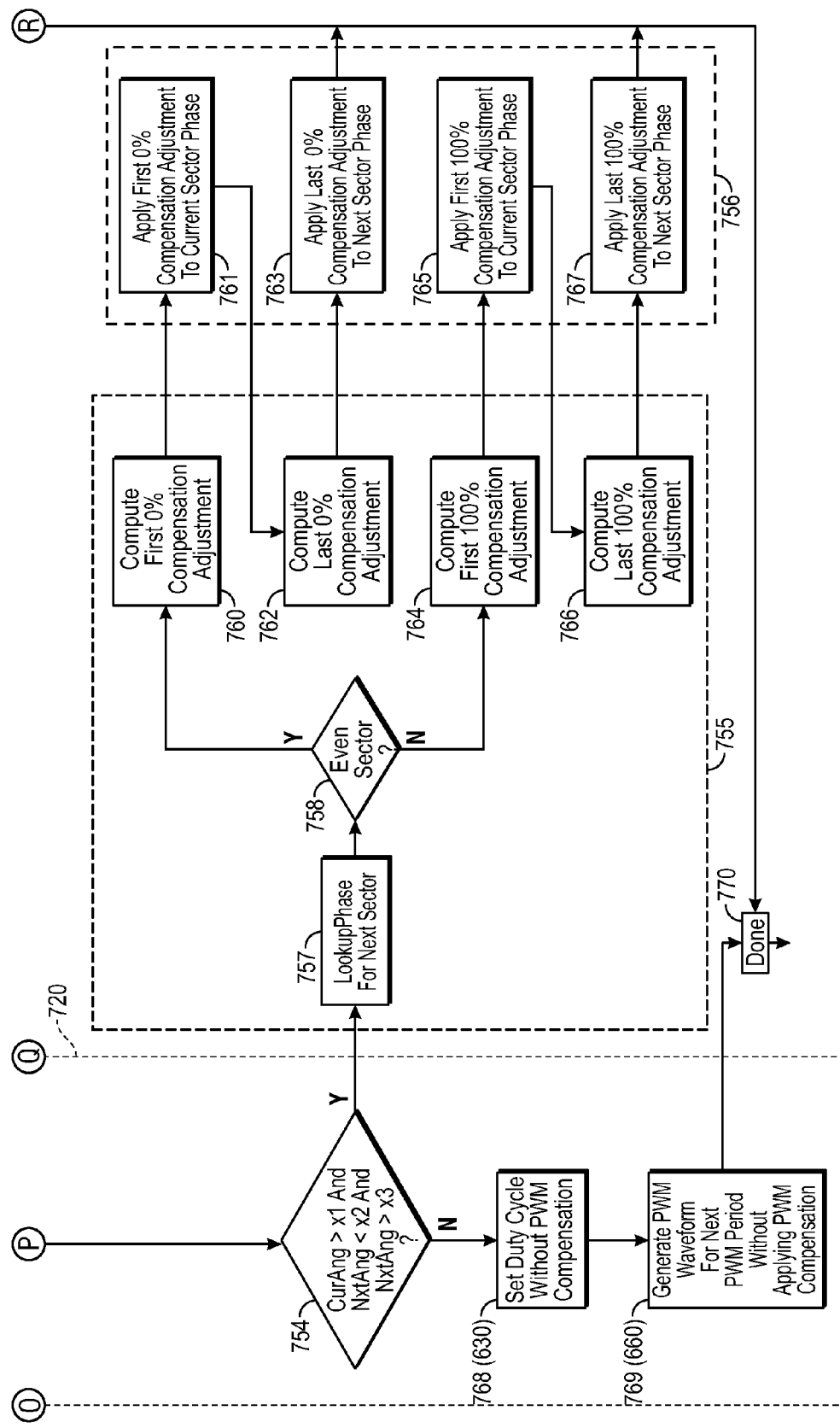

When the SVPWM module 108 determines (at step 746) that that the current PWM boundary angle (CurAng) 788 is greater than the first transition angle (X1) 790, or that the next PWM boundary angle (NxtAng) 798 is less than the second transition angle (X2) 792, or that the next PWM boundary angle (NxtAng) 798 is greater than the third transition angle (X3) 793, then the method 700 proceeds to step 754 (FIG. 7J).

At step 754, the SVPWM module 108 performs three checks to determine how to proceed. More specifically, at step 754, the SVPWM module 108 determines whether the current PWM boundary angle (CurAng) 788 is greater than the first transition angle (X1) 790, determines whether the current PWM boundary angle (CurAng) 788 is less than the second transition angle (X2) 792, and determines whether the next PWM boundary angle (NxtAng) 798 is greater than the third transition angle (X3) 793.

As illustrated in FIG. 7J, when the SVPWM module 108 determines that the current PWM boundary angle (CurAng) 788 is less than the first transition angle (X1) 790, or that the current PWM boundary angle (CurAng) 788 is greater than the second transition angle (X2) 792, or that the next PWM boundary angle (NxtAng) 798 is less than the third transition angle (X3) 793, then the method 700 to step 768. At step 768, where the SVPWM module 108 sets the duty cycle for the next, forecasted PWM period without applying any PWM compensation. The method 700 then proceeds to step 769, where the SVPWM module 108 generates pulse width modulated (PWM) waveforms for the next PWM period, after which the method 700 ends at step 770. At step 769, the duty cycle of the pulse width modulated waveforms for the next PWM period will be the set duty cycle (without compensation).

By contrast, when the SVPWM module 108 determines that the current PWM boundary angle (CurAng) 788 is greater than the first transition angle (X1) 790, determines that the current PWM boundary angle (CurAng) 788 is less than the second transition angle (X2) 792, and determines that the next PWM boundary angle (NxtAng) 798 is greater than the third transition angle (X3) 793, then the method 700 proceeds to step 757, where the SVPWM module 108 looks-up the phase for the next sector. Here, the phase for the next sector is looked-up at step 757 since the third transition angle (X3) 793 is in the next sector not in the current sector.

The method 700 then proceeds to step 758, where the SVPWM module 108 determines if the current sector is an even-numbered sector.

Figure 7K:
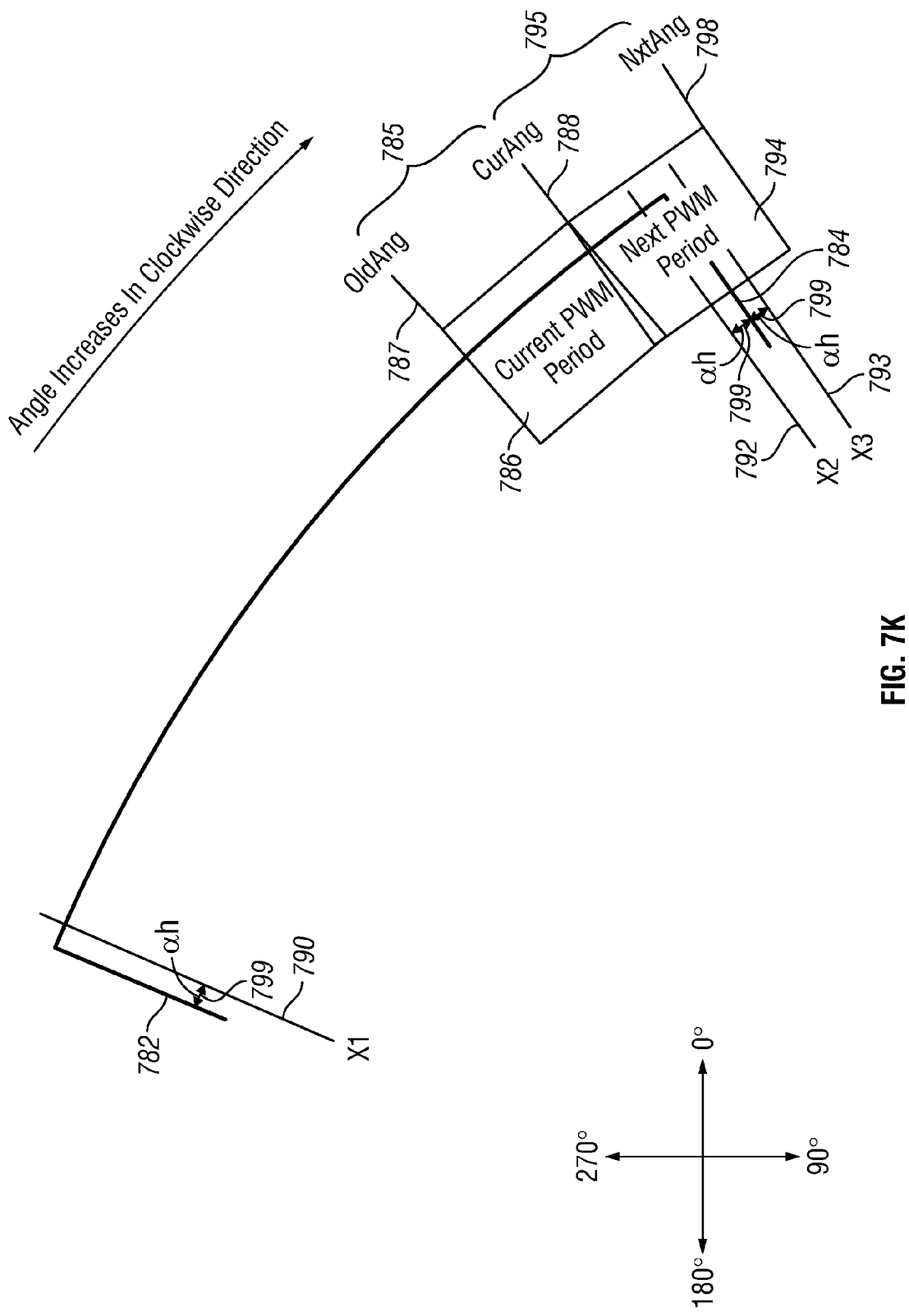

FIG. 7K is sector diagram that illustrates a scenario where the current PWM boundary angle (CurAng) 788 is greater than the first transition angle (X1) 790, the current PWM boundary angle (CurAng) 788 is less than the second transition angle (X2) 792, the next PWM boundary angle (NxtAng) 798 is greater than the third transition angle (X3) 793, and both the second transition angle (X2) 792 and the third transition angle (X3) 793 fall within or occur in the next, forecasted PWM period 794. In this scenario, because the second transition angle (X2) 792 and the third transition angle (X3) 793 fall within or occur in the next, forecasted PWM period 794, the duty cycle during the next PWM period will be modified as described below.

Referring again to FIG. 7J, when the SVPWM module 108 determines that the current sector is an even-numbered sector, the method proceeds to step 760, where the SVPWM module 108 computes a leading-edge 0% compensation to the current sector phase, and then applies trailing-edge 0% compensation to the current sector phase at step 761 to generate the modified duty cycle for the next PWM period, computes a trailing-edge 0% compensation at 762, and then applies the trailing-edge 0% compensation to the next sector phase at step 763 to generate the modified duty cycle for the next PWM period. Here, each transition angle can be processed separately and two compensations are applied to different phases. The method 700 then ends at step 770.

As used herein, the term "leading-edge 0% compensation" refers to compensation that the SVPWM module 108 computes at step 760 of FIG. 7J to adjust the duty cycle of the PWM waveforms of the switching vector signals (Sa . . . Se) 109, and in one implementation can be computed based on equations (29, 20 and 30) as follows:

$$CompDuty1 = (NxtAng - x3)/DeltaPos \qquad (29)$$

$$DutySlope = (A*AlphaHold+B)/(100\%+AlphaHold*(C+D*AlphaHold)) \qquad (20)$$

$$NextDuty = DutySlope*(NxtAng - x3) \qquad (30)$$

In one implementation, the SVPWM module 108 then applies the "leading-edge 0% compensation" at step 761 based on equation (22) as follows:

$$FirstModifiedPWM = NextDuty*CompDuty1 \qquad (22)$$

where CompDuty1 is the computed duty cycle compensation computed via equation (29), and where NextDuty is the result of equation (30).

As used herein, the term "trailing-edge 0% compensation" refers to compensation that the SVPWM module 108 computes at step 762 of FIG. 7J to adjust the duty cycle of the PWM waveforms of the switching vector signals (Sa . . . Se) 109, and in one implementation can be computed based on equation (31) as follows:

$$CompDuty2 = (x2 - CurAng)/(Sector\ Boundary\ 798 - CurAng) \qquad (31).$$

In one implementation, the SVPWM module 108 then applies the "trailing-edge 0% compensation" at step 763 based on equation (32) as follows:

$$SecondModifiedPWM = FirstPWM*(CompDuty2) \qquad (32),$$

where CompDuty2 is the computed duty cycle compensation computed via equation (31).

By contrast, when the SVPWM module 108 determines that the current sector is an odd-numbered sector, the method proceeds to step 764, where the SVPWM module 108 computes a leading-edge 100% compensation, applies the leading-edge 100% compensation to the current sector phase at step 765 to generate the modified duty cycle for the next PWM period, then computes a trailing-edge 100% compensation at 766, and then applies the trailing-edge 100% compensation to the next sector phase at step 767 to generate the modified duty cycle for the next PWM period. The method 700 then ends at step 770.

As used herein, the term "leading-edge 100% compensation" refers to compensation that the SVPWM module 108 computes at step 764 of FIG. 7J to adjust the duty cycle of the PWM waveforms of the switching vector signals (Sa . . . Se) 109, and in one implementation can be computed based on equation (29, 20 and 33) as follows:

$$CompDuty3 = (NxtAng - x3)/DeltaPos \qquad (29)$$

$$DutySlope = (A*AlphaHold+B)/(100\%+AlphaHold*(C+D*AlphaHold)) \qquad (20)$$

$$NextDuty = -DutySlope*(NxtAng - x3) + 100\% \qquad (33)$$

In one implementation, the SVPWM module 108 then applies the "leading-edge 100% compensation" at step 765 based on equation (34) as follows:

$$FirstModifiedPWM = (100\% - NextDuty)*(100\% - CompDuty3) + NextDuty \qquad (34)$$

where CompDuty3 is the computed duty cycle compensation computed via equation (29), and where NextDuty is the result of equation (33).

As used herein, the term "trailing-edge 100% compensation" refers to compensation that the SVPWM module 108 computes at step 766 of FIG. 7J to adjust the duty cycle of the PWM waveforms of the switching vector signals (Sa . . . Se) 109, and in one implementation can be computed based on equation (31) as follows:

$$CompDuty2 = (x2 - CurAng)/(Sector\ Boundary\ 798 - CurAng) \qquad (31)$$

In one implementation, the SVPWM module 108 then applies the "trailing-edge 100% compensation" at step 767 based on equation (35) as follows:

$$SecondModifiedPWM = FirstPWM + (100\% - FirstPWM)*CompDuty2 \qquad (35)$$

where CompDuty4 is the computed duty cycle compensation computed via equation (31).

Thus, various embodiments have been described for controlling operation of a multi-phase machine in a vector controlled motor drive system when the multi-phase machine operates in an overmodulation region. The disclosed embodiments provide a mechanism for adjusting a duty cycle of PWM waveforms so that the rising-edge and falling-edge transitions occur at the correct positions. As noted above, this can reduce variations/errors in the phase voltage applied to the multi-phase machine so that phase current may be properly regulated thus reducing current/torque oscillation, which can in turn improve machine efficiency and performance, as well as utilization of the DC voltage source.

Those of skill in the art would further appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for controlling a multi-phase electric machine that is operating in an overmodulation region, the method comprising:
   determining sector boundary information for a current sector that defines an angular span between two adjacent voltage switching vectors that are used to generate pulse width modulated (PWM) waveforms of switching vector signals that drive switches in a five-phase inverter module, wherein the sector boundary information comprises: a sector boundary starting angle of the current sector, and a sector boundary ending angle of the current sector;
   computing an angular span of a current PWM period based on a switching frequency of a PWM generator and a particular instantaneous speed of the multi-phase electric machine, and forecasting a forecasted angular span of a next PWM period before the next PWM period occurs based on the angular span of the current PWM period;
   computing a plurality of transition angles based on the sector boundary information and a hold angle that is provided from an overmodulation processor;
   determining whether any of the transition angles occur within the forecasted angular span of the next PWM period;
   computing, when any of the transition angles are determined to occur within the forecasted angular span of the next PWM period, a duty cycle compensation for the next PWM period that is used to adjust the duty cycle for the PWM waveforms of the switching vector signals that will be generated during the next PWM period; and
   applying the computed duty cycle compensation when generating PWM waveforms for the next PWM period before the next PWM period occurs to adjust the duty cycle the next PWM period.

2. A method according to claim 1, wherein the transition angles include a first transition angle, a second transition angle, and a third transition angle, and wherein the step of computing a plurality of transition angles based on the sector boundary information and a hold angle that is provided from an overmodulation processor, comprises:
   computing the sum of the sector boundary starting angle and the hold angle to generate the first transition angle, wherein the hold angle is a variable command that is a function of modulation index;
   computing the difference between the sector boundary ending angle and the hold angle to generate the second transition angle; and
   computing the sum of the computed sector boundary ending angle and the hold angle to generate the third transition angle.

3. A method according to claim 2, wherein the hold angle is a variable command that is a function of modulation index and that ranges between a minimum value of 0 degrees and a maximum number of degrees that is equal to one-half the angular span of the sector.

4. A method according to claim 1, wherein the duty cycle compensation for the next PWM period varies depending on where the transition angles are expected to occur with respect to the next PWM period, and wherein the duty cycle compensation for the next PWM period comprises:

trailing-edge 100% compensation or trailing-edge 0% compensation;
leading-edge 0% compensation or leading-edge 100% compensation;
falling-edge slope-derived compensation or rising-edge slope-derived compensation;
a leading-edge 0% compensation and a trailing-edge 0% compensation; or
a leading-edge 100% compensation and a trailing-edge 100% compensation.

5. A method according to claim 2, wherein the angular span of the current PWM period is defined by an old PWM boundary angle that represents the start of the current PWM period, and a current PWM boundary angle that represents the end of the current PWM period, and wherein the forecasted angular span is the angular distance that will be covered by the next PWM period, and is defined by the current PWM boundary angle that represents the start of the next PWM period, and a next PWM boundary angle that represents the end of the next PWM period, and wherein the step of determining whether any of the transition angles occur within the forecasted angular span of the next PWM period, comprises:
determining, when the next PWM boundary angle is not less than the first transition angle and the current PWM boundary angle is not greater than the third transition angle, whether the hold angle is greater than or equal to one-half of the angular span of the current sector; and
further comprising:
determining, when the hold angle is greater than or equal to one-half of the angular span the current sector, whether the current sector is an even-numbered sector or an odd-numbered sector.

6. A method according to claim 5, wherein the step of computing, when any of the transition angles are determined to occur within the forecasted angular span of the next PWM period, a duty cycle compensation for the next PWM period, comprises:
computing, when the current sector is an even-numbered sector, trailing-edge 100% compensation based on the first transition angle, the current PWM boundary angle, and the forecasted angular span of the next PWM period; and
computing, when the current sector is an odd-numbered sector, leading-edge 100% compensation based on the first transition angle, the next PWM boundary angle, and the forecasted angular span of the next PWM period.

7. A method according to claim 6, wherein the step of applying comprises:
applying the computed trailing-edge 100% compensation to modify a duty cycle of the PWM waveforms for the next PWM period.

8. A method according to claim 6, wherein the step of applying comprises:
applying the computed leading-edge 100% compensation to modify a duty cycle of the PWM waveforms for the next PWM period.

9. A method according to claim 5, wherein the step of determining whether any of the transition angles occur within the forecasted angular span of the next PWM period, comprises:
determining, when the hold angle is less than one-half of the angular span the current sector, whether the current PWM boundary angle is less than the first transition angle, whether the next PWM boundary angle is greater than the first transition angle, and whether the next PWM boundary angle is less than the second transition angle; and
further comprising:
determining whether the current sector is an even-numbered sector or an odd-numbered sector when the current PWM boundary angle is less than the first transition angle, the next PWM boundary angle is greater than the first transition angle, and the next PWM boundary angle is less than the second transition angle.

10. A method according to claim 9, wherein the step of computing, when any of the transition angles are determined to occur within the forecasted angular span of the next PWM period, a duty cycle compensation for the next PWM period, comprises:
computing, when the current sector is an even-numbered sector, trailing-edge 100% compensation based on the first transition angle, the current PWM boundary angle, and the forecasted angular span of the next PWM period; and
computing, when the current sector is an odd-numbered sector, trailing-edge 0% compensation based on the first transition angle, the next PWM boundary angle, and the forecasted angular span of the next PWM period.

11. A method according to claim 10, wherein the step of applying the computed duty cycle compensation comprises:
applying the computed trailing-edge 100% compensation to modify a duty cycle of the PWM waveforms for the next PWM period.

12. A method according to claim 10, wherein the step of applying the computed duty cycle compensation comprises:
applying the computed trailing-edge 0% compensation to modify a duty cycle of the PWM waveforms for the next PWM period.

13. A method according to claim 9, wherein the step of determining whether any of the transition angles occur within the forecasted angular span of the next PWM period, further comprises:
when the current PWM boundary angle is not less than the first transition angle, or that the next PWM boundary angle is not greater than the first transition angle, or that the next PWM boundary angle is not less than the second transition angle, determining whether the current PWM boundary angle is greater than the first transition angle, whether the current PWM boundary angle is less than the second transition angle, whether the next PWM boundary angle is greater than the second transition angle, and whether the next PWM boundary angle is less than the third transition angle; and
further comprising:
determining, when the current PWM boundary angle is greater than the first transition angle, the current PWM boundary angle is less than the second transition angle, the next PWM boundary angle is greater than the second transition angle, and the next PWM boundary angle is less than the third transition angle, whether the current sector is an even-numbered sector or an odd-numbered sector.

14. A method according to claim 13, wherein the step of computing, when any of the transition angles are determined to occur within the forecasted angular span of the next PWM period, a duty cycle compensation for the next PWM period, comprises:
computing, when the current sector is an even-numbered sector, leading-edge 0% compensation based on the next PWM boundary angle that represents the end of the next PWM period, the hold angle, the second transition angle, and the forecasted angular span of the next PWM period; and computing, when the current sector is an odd-numbered sector, leading-edge 100% compensation based on the next PWM boundary angle that represents the end of the next PWM period, the hold angle, the second transition angle, and the forecasted angular span of the next PWM period.

15. A method according to claim 14, wherein the step of applying the computed duty cycle compensation comprises:
applying the computed leading-edge 0% compensation to modify a duty cycle of the PWM waveforms for the next PWM period.

16. A method according to claim 14, wherein the step of applying the computed duty cycle compensation comprises:
applying the computed leading-edge 100% compensation to modify a duty cycle of the PWM waveforms for the next PWM period.

17. A method according to claim 14, wherein the step of determining whether any of the transition angles occur within the forecasted angular span of the next PWM period, further comprises:
when the current PWM boundary angle is not greater than the first transition angle, or the current PWM boundary angle is not less than the second transition angle, or the next PWM boundary angle is not greater than the second transition angle, or the next PWM boundary angle is greater than the third transition angle, then the method 700 proceeds to step 746, determining whether the current PWM boundary angle is less than the first transition angle, whether the next PWM boundary angle is greater than the second transition angle, and whether the next PWM boundary angle is less than the third transition angle; and
further comprising:
when the current PWM boundary angle is less than the first transition angle, the next PWM boundary angle is greater than the second transition angle, and the next PWM boundary angle is less than the third transition angle, determining whether the current sector is an even-numbered sector or an odd-numbered sector.

18. A method according to claim 17, wherein the step of computing, when any of the transition angles are determined to occur within the forecasted angular span of the next PWM period, a duty cycle compensation for the next PWM period, comprises:
computing, when the current sector is a falling-edge slope-derived compensation based on the hold angle, the sector boundary starting angle of the current sector, the current PWM boundary angle, the next PWM boundary angle that represents the end of the next PWM period, the second transition angle; and
computing, when the current sector is an odd-numbered sector, a rising-edge slope-derived compensation based on the hold angle, the sector boundary starting angle of the current sector, the current PWM boundary angle, the next PWM boundary angle that represents the end of the next PWM period, the second transition angle.

19. A method according to claim 18, wherein the step of applying the computed duty cycle compensation comprises:
applying the computed falling-edge slope-derived compensation to modify a duty cycle of the PWM waveforms for the next PWM period.

20. A method according to claim 18, wherein the step of applying the computed duty cycle compensation comprises:
applying the computed rising-edge slope-derived compensation to modify a duty cycle of the PWM waveforms for the next PWM period.

21. A method according to claim 17, wherein the step of determining whether any of the transition angles occur within the forecasted angular span of the next PWM period, further comprises:
when the current PWM boundary angle is greater than the first transition angle, or the next PWM boundary angle is less than the second transition angle, or the next PWM boundary angle is greater than the third transition angle, determining, whether the current PWM boundary angle is greater than the first transition angle, whether the current PWM boundary angle is less than the second transition angle, and whether the next PWM boundary angle is greater than the third transition angle; and
when the current PWM boundary angle is greater than the first transition angle, and the current PWM boundary angle is less than the second transition angle, and the next PWM boundary angle is greater than the third transition angle, further comprising:
determining the phase for the next sector; and
determining whether the current sector is an even-numbered sector or an odd-numbered sector.

22. A method according to claim 21, wherein the step of computing, when any of the transition angles are determined to occur within the forecasted angular span of the next PWM period, a duty cycle compensation for the next PWM period, comprises:
computing, when the current sector is an even-numbered sector:
a leading-edge 0% compensation for the current sector phase based on based on the next PWM boundary angle that represents the end of the next PWM period, the third transition angle, the forecasted angular span of the next PWM period, and the hold angle, and
a trailing-edge 0% compensation for the next sector phase based on the next PWM boundary angle that represents the end of the next PWM period, the second transition angle, and the current PWM boundary angle; and
computing, when the current sector is an odd-numbered sector:
a leading-edge 100% compensation for the current sector phase based on based on the next PWM boundary angle that represents the end of the next PWM period, the third transition angle, the forecasted angular span of the next PWM period, and the hold angle, and
a trailing-edge 100% compensation for the next sector phase based on the next PWM boundary angle that represents the end of the next PWM period, the second transition angle, and the current PWM boundary angle.

23. A method according to claim 22, wherein the step of applying the computed duty cycle compensation comprises:
applying the computed leading-edge 0% compensation and the computed trailing-edge 0% compensation to modify a duty cycle of the PWM waveforms for the next PWM period.

24. A method according to claim 22, wherein the step of applying the computed duty cycle compensation comprises:
applying the computed leading-edge 100% compensation and the computed trailing-edge 100% compensation to modify a duty cycle of the PWM waveforms for the next PWM period.

* * * * *